10

United States Patent
Hwang et al.

(10) Patent No.: US 8,675,024 B2
(45) Date of Patent: Mar. 18, 2014

(54) MOBILE TERMINAL AND DISPLAYING METHOD THEREOF

(75) Inventors: Soon Jae Hwang, Seoul (KR); Junghee Hong, Seoul (KR); Yookyung Lim, Seoul (KR); Imkyeong You, Seoul (KR); Hyedeuk Lee, Seoul (KR); Dukhwan Chung, Seoul (KR)

(73) Assignee: LG Electronics Inc., Seoul (KR)

( * ) Notice: Subject to any disclaimer, the term of this patent is extended or adjusted under 35 U.S.C. 154(b) by 215 days.

(21) Appl. No.: 13/029,483

(22) Filed: Feb. 17, 2011

(65) Prior Publication Data

US 2012/0139951 A1    Jun. 7, 2012

(30) Foreign Application Priority Data

Dec. 6, 2010  (KR) .......................... 10-2010-0123259

(51) Int. Cl.
    *G09G 5/00*    (2006.01)
(52) U.S. Cl.
    USPC .......................................... 345/661; 345/665
(58) Field of Classification Search
    USPC ....................................................... 345/661
    See application file for complete search history.

(56) References Cited

U.S. PATENT DOCUMENTS

| 7,796,141 B2 * | 9/2010 | Sheridan ........................ 345/660 |
| 7,889,217 B2 * | 2/2011 | Sakuma et al. ................ 345/699 |
| 2003/0025678 A1 | 2/2003 | Lee et al. |
| 2008/0001924 A1 * | 1/2008 | de los Reyes et al. ........ 345/173 |
| 2010/0082784 A1 * | 4/2010 | Rosenblatt et al. ........... 709/222 |
| 2010/0182248 A1 | 7/2010 | Chun |
| 2010/0315366 A1 * | 12/2010 | Lee et al. ....................... 345/173 |
| 2011/0043527 A1 * | 2/2011 | Ording et al. .................. 345/428 |
| 2011/0181528 A1 * | 7/2011 | Capela et al. .................. 345/173 |

FOREIGN PATENT DOCUMENTS

EP          1959337           8/2008

* cited by examiner

*Primary Examiner* — David Zarka
*Assistant Examiner* — Richard M Russell
(74) *Attorney, Agent, or Firm* — Lee, Hong, Degerman, Kang & Waimey

(57) ABSTRACT

A mobile terminal includes a wireless communication unit communicating with at least one electronic device, a display including a touch screen receiving touch input and displaying contents, and a controller executing an application related to the contents and reducing a first area of the touch screen on which the contents are displayed in response to a first input, thus reducing a size of the displayed contents. The controller further displays information about the at least one electronic device at a second area of the touch screen generated when the first area is reduced.

17 Claims, 36 Drawing Sheets

FIG. 26

| CONTENTS 1 | ELECTRONIC DEVICE | | | CONTENTS 2 |
|---|---|---|---|---|
| Web page | ◯ | TV | ◯ | Audio |
| | ◯ | TABLET | ◯ | |
| | ◯ | DIGITAL FRAME | ✕ | |
| | ✕ | SPEAKER | ◯ | |

| ELECTRONIC DEVICE | FUNCTION |
|---|---|
| TV | PLAYING |
| PC | PLAYING |
|  | STORING |
| SERVER | STORING |
|  | TRANSFERRING |

1

MOBILE TERMINAL AND DISPLAYING METHOD THEREOF

CROSS REFERENCE TO RELATED APPLICATIONS

Pursuant to 35 U.S.C. §119(a), this application claims the benefit of earlier filing date and right of priority to Korean Patent Application No. 10-2010-0123259 filed on Dec. 6, 2010, the contents of which are hereby incorporated by reference herein in their entirety.

FIELD OF THE INVENTION

The present invention relates to a mobile terminal and a method of controlling the mobile terminal to effectively display information of other electronic devices on a display of the mobile terminal such that displayed contents are easily shared between the mobile terminal and the other electronic devices.

DISCUSSION OF THE RELATED ART

Terminals, such as personal computers, laptop computers, cellular phones and the like, have diversified functions. For example, the terminals may be used as a multimedia player for capturing still pictures or moving images, playing music, playing games, and receiving broadcast programs.

Terminals may be classified to mobile terminals and stationary terminals. The mobile terminals can be classified into handheld terminals and vehicle mounted terminals according to their mode of carriage.

To support and enhance functions of a terminal, a structure and/or a software implementation of the terminal may need to be further improved. Such improved terminals include mobile terminals that are capable of providing a variety of complex functions.

SUMMARY

According to an embodiment, a mobile terminal includes a wireless communication unit communicating with at least one electronic device, a display including a touch screen receiving touch input and displaying contents, and a controller executing an application related to the contents and reducing a first area of the touch screen on which the contents are displayed in response to a first input, thus reducing a size of the displayed contents. The controller further displays information about the at least one electronic device at a second area of the touch screen generated when the first area is reduced.

According to another embodiment, a mobile terminal includes a wireless communication unit communicating with at least one electronic device, a display including a touch screen receiving a touch input and displaying contents, and a controller generating at least one-layered area for displaying information about the at least one electronic device on the display, the at least one-layered area being generated around all sides of a main area on which the contents is displayed in response to the touch input, wherein a number of layers of the at least one-layered area is determined based on at least a drag length of the touch input or a number of touch inputs.

According to yet another embodiment, a method of controlling a mobile terminal includes displaying contents on a display of the mobile terminal, receiving a first input via an input unit of the mobile terminal, reducing a size of a first area of the display on which the contents are displayed in response to the first input, and displaying information about at least one electronic device in a second area generated when the size of the first area is reduced.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures.

FIG. 26 illustrates a selective contents transmission operation of a mobile terminal according to an embodiment of the present invention.

DETAILED DESCRIPTION

The present invention will now be described more fully with reference to the accompanying drawings, in which exemplary embodiments of the present invention are shown. The present invention may, however, be embodied in many different forms and should not be construed as being limited to the embodiments set forth herein; rather, these embodiments are provided so that this disclosure will be thorough and complete, and will fully convey the concept of the present invention to those skilled in the art. Wherever possible, the same reference numbers will be used throughout the drawings to refer to the same or similar parts.

Hereinafter, a mobile terminal relating to the present invention will be described below in more detail with reference to the accompanying drawings. In the following description, suffixes "module" and "unit" are given to components of the mobile terminal in order to facilitate the disclosure only and do not have significant meanings or functions discriminated from each other. Therefore, it is understood that the "module" and "unit" can be used together or interchangeably. The mobile terminal described in the specification may include a cellular phone, a smart phone, a laptop computer, a digital broadcasting terminal, a personal digital assistant (PDA), a portable multimedia player (PMP), a navigation system and so on.

Figure 1:
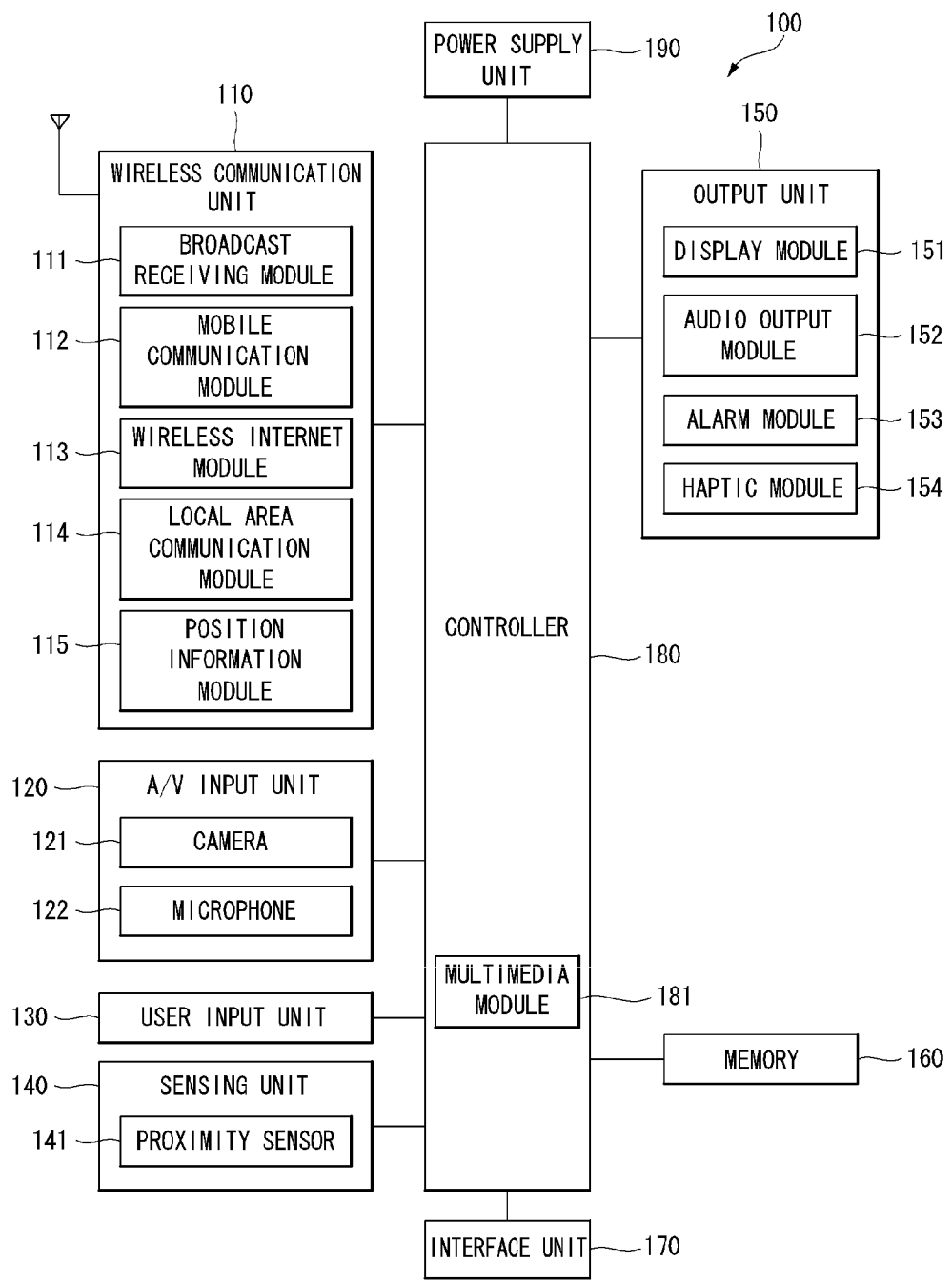
FIG. 1 is a block diagram of a mobile terminal according to an embodiment of the present invention.

FIG. 1 is a block diagram of a mobile terminal 100 according to an embodiment of the present invention. Other embodiments, configurations and arrangements may also be provided. As shown in FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply 190. Not all of the components shown in FIG. 1 may be essential parts and the number of components included in the mobile terminal 100 may be varied. The components of the mobile terminal 100 will now be described.

The wireless communication unit 110 may include at least one module that enables wireless communication between the mobile terminal 100 and a wireless communication system or between the mobile terminal 100 and a network in which the mobile terminal 100 is located. For example, the wireless communication unit 110 may include a broadcast receiving module 111, a mobile communication module 112, a wireless Internet module 113, a short-range communication module 114, and a position-location module 115.

The broadcast receiving module 111 may receive broadcast signals and/or broadcast related information from an external broadcast management server through a broadcast channel. The broadcast channel may include a satellite channel and a terrestrial channel, and the broadcast management server may be a server that generates and transmits broadcast signals and/or broadcast related information or a server that receives previously created broadcast signals and/or broadcast related information and transmits the broadcast signals and/or broadcast related information to a terminal.

The broadcast signals may include not only TV broadcast signals, radio broadcast signals, and data broadcast signals but also signals in the form of a combination of a TV broadcast signal and a radio broadcast signal. The broadcast related information may be information on a broadcast channel, a broadcast program or a broadcast service provider, and may be provided through a mobile communication network. In the latter case, the broadcast related information may be received by the mobile communication module 112.

The broadcast related information may exist in various forms. For example, the broadcast related information may exist in the form of an electronic program guide (EPG) of a digital multimedia broadcasting (DMB) system or in the form of an electronic service guide (ESG) of a digital video broadcast-handheld (DVB-H) system.

The broadcast receiving module 111 may receive broadcast signals using various broadcasting systems. For example, the broadcast receiving module 111 may receive digital broadcast signals using digital broadcasting systems such as a digital multimedia broadcasting-terrestrial (DMB-T) system, a digital multimedia broadcasting-satellite (DMB-S) system, a media forward link only (MediaFLO®) system, a DVB-H system, and an integrated services digital broadcast-terrestrial (ISDB-T) system. The broadcast receiving module 111 may receive signals from broadcasting systems providing broadcast signals other than the above-described digital broadcasting systems.

The broadcast signals and/or broadcast related information received through the broadcast receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and the like may be used as a wireless Internet technology.

The short-range communication module 114 may correspond to a module for local area communication. Further, Bluetooth®, radio frequency identification (RFID), infrared data association (IrDA), ultra wideband (UWB) and/or Zig-Bee® may be used as a local area communication technology.

The position-location module 115 may confirm or obtain the position of the mobile terminal 100. The position-location module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan among others.

A global positioning system (GPS) module is a representative example of the position-location module 115. The GPS module may calculate information on distances between one point or object and at least three satellites and information on a time when the distance information is measured, and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. In addition, the GPS module may continuously calculate the current position in real time and calculate velocity information using the location or position information.

As shown in FIG. 1, the A/V input unit 120 may input an audio signal or a video signal and include a camera 121 and a microphone 122. The camera 121 may process image frames of still images or moving images obtained by an image sensor in a video telephony mode or a photographing mode. The processed image frames may be displayed on a display module 151 which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode or a speech recognition mode and process the received audio signal into electric audio data. The audio data may then be converted into a form that can be transmitted to a mobile communication base station through the mobile communication module 112 and output in the call mode. The microphone 122 may employ various noise removal (or canceling) algorithms for removing or reducing noise generated when the external audio signal is received.

The user input unit 130 may receive input data for controlling an operation of the mobile terminal 100 from a user. The user input unit 130 may include a keypad, a dome switch, a touch pad (constant voltage/capacitance), a jog wheel, a jog switch and on the like.

The sensing unit 140 may sense a current state of the mobile terminal 100, such as an open/closed state of the mobile terminal 100, a position of the mobile terminal 100, a user touch or contact with the mobile terminal 100, a direction of the mobile terminal 100, and acceleration/deceleration of the mobile terminal 100, and generate a sensing signal for controlling an operation of the mobile terminal 100. For example, if the mobile terminal 100 is configured as a slide phone, the sensing unit 140 may sense whether the slide phone is opened or closed. Further, the sensing unit 140 may sense whether the power supply 190 supplies power and/or whether the interface unit 170 is connected to an external device. The sensing unit 140 may also include a proximity sensor 141.

The output unit 150 may generate visual, auditory and/or tactile output and may include the display module 151, an audio output module 152, an alarm unit 153 and a haptic module 154. The display module 151 may display information processed by the mobile terminal 100. The display module 151 may display a user interface (UI) or a graphic user interface (GUI) related to a telephone call when the mobile terminal 100 is in the call mode. The display module 151 may also display a captured and/or received image, a UI or a GUI when the mobile terminal 100 is in the video telephony mode or the photography mode.

In addition, the display module 151 may include at least one of a liquid crystal display, a thin film transistor liquid crystal display, an organic light-emitting diode display, a flexible display and a three-dimensional display. Some of these displays may be of a transparent type or a light transmissive type. That is, the display module 151 may include a transparent display.

The transparent display may include a transparent liquid crystal display. The rear structure of the display module 151 may also be of a light transmissive type. Accordingly, a user may see an object located behind the body of the mobile terminal 100 through the transparent area of the body of the mobile terminal 100 that is occupied by the display module 151.

The mobile terminal 100 may also include at least two display modules 151. For example, the mobile terminal 100 may include a plurality of display modules 151 that are arranged on a single surface at a predetermined distance or integrated displays. The plurality of display modules 151 may also be arranged on different surfaces.

Further, when the display module 151 and a sensor sensing touch (hereafter referred to as a touch sensor) form a layered structure, that is referred to as a touch screen, the touch screen display module 151 may be used as an input device in addition to an output device. The touch sensor may be in the form of a touch film, a touch sheet, and a touch pad, for example.

The touch sensor may convert a variation in pressure applied to a specific portion of the display module 151 or a variation in capacitance generated at a specific portion of the display module 151 into an electric input signal. The touch sensor may sense a pressure of touch as well as a position and an area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display module 151.

The proximity sensor 141 of the sensing unit 140 may be located in an internal region of the mobile terminal 100, surrounded by the touch screen, or near the touch screen. The proximity sensor 141 may sense an object approaching a predetermined sensing surface or an object located near the proximity sensor 141 using an electromagnetic force or infrared rays without mechanical contact. The proximity sensor 141 may be more durable and versatile than a contact type sensor.

The proximity sensor 141 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor 141.

For ease of convenience of explanation, an action of the pointer approaching the touch screen without actually touching the touch screen may be referred to as a proximity touch and an action of bringing the pointer into direct contact with the touch screen may be referred to as a contact touch. The proximity touch point of the pointer on the touch screen may correspond to a point of the touch screen at which the pointer is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state, and the like). Information corresponding to the sensed proximity touch action and proximity touch pattern may then be displayed on the touch screen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and the like. The audio output module 152 may output sounds through an earphone jack. The user may hear the sounds by connecting an earphone to the earphone jack.

The alarm unit 153 may output a signal for indicating generation of an event of the mobile terminal 100. For example, alarms may be generated when receiving a call signal, receiving a message, inputting a key signal, or inputting touch. The alarm unit 153 may also output signals in forms different from video signals or audio signals, for example, a signal for indicating generation of an event through vibration. The video signals or the audio signals may also be output through the display module 151 or the audio output module 152.

The haptic module 154 may generate various haptic effects that the user can feel. One example of the haptic effects is vibration. The intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contacted skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operation of the controller 180 and temporarily store input/output data such as a phone book, messages, still images, and/or moving images. The memory 160 may also store data about vibrations and sounds in various patterns that are output when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk or an optical disk. The mobile terminal 100 may also operate in relation to a web storage performing the storing function of the memory 160 on the Internet.

The interface unit 170 may serve as a path to external devices connected to the mobile terminal 100. The interface unit 170 may receive data or power from the external devices and transmit the data or power to internal components of the mobile terminal 100 or transmit data of the mobile terminal 100 to the external devices. For example, the interface unit 170 may include a wired/wireless headset port, an external charger port, a wired/wireless data port, a memory card port, a port for connecting a device having a user identification module, an audio I/O port, a video I/O port, and/or an earphone port.

The interface unit 170 may also interface with a user identification module that is a chip that stores information for authenticating authority to use the mobile terminal 100. For example, the user identification module may be a user identity module (UIM), a subscriber identity module (SIM) and a universal subscriber identity module (USIM). An identification device including the user identification module may also be manufactured in the form of a smart card. Accordingly, the identification device may be connected to the mobile terminal 100 through a port of the interface unit 170.

The interface unit 170 may also be a path through which power from an external cradle is provided to the mobile terminal 100 when the mobile terminal 100 is connected to the external cradle, or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 as shown in FIG. 1 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to hardware implementation, embodiments of the present disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. The embodiments may be implemented by the controller 180.

According to software implementation, embodiments such as procedures or functions may be implemented with a separate software module executing at least one function or operation. Software codes may be implemented according to a software application written in an appropriate software language. The software codes may be stored in the memory 160 and executed by the controller 180.

Figure 2A:
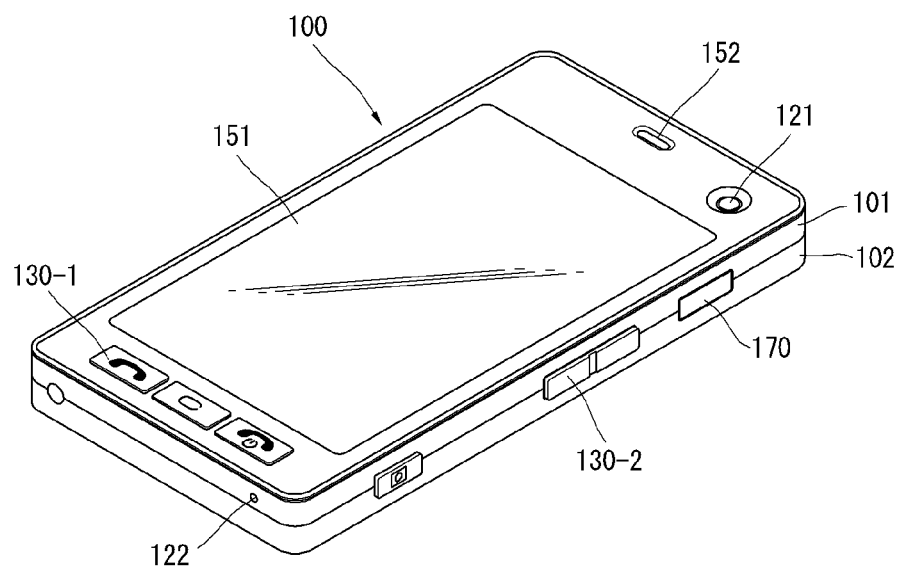
FIG. 2A is a front perspective view of a mobile terminal according to an embodiment of the present invention.

FIG. 2A is a front perspective view of a mobile terminal 100 or a handheld terminal according to an embodiment of the present invention. While the handheld terminal 100 shown in FIG. 2A has a bar type terminal body, the present invention is not limited to a bar type terminal and can be applied to terminals of various types including slide type, folder type, swing type and swivel type terminals having at least two bodies that are relatively movably combined.

The terminal body includes a case, such as a casing, a housing, a cover, and the like, forming the exterior of the mobile terminal 100. In the present embodiment, the case can be divided into a front case 101 and a rear case 102. Various electronic components are arranged in the space formed between the front case 101 and the rear case 102. At least one middle case can be additionally arranged between the front case 101 and the rear case 102. The cases may be formed of plastics through injection molding or made of a metal material such as stainless steel (STS) or titanium (Ti).

The display module 151, the audio output unit 152, the camera 121, the user input unit 130 (130-1 and 130-2), the microphone 122 and the interface unit 170 can be arranged in the terminal body, specifically, in the front case 101.

Referring to FIG. 2A, the display module 151 occupies most of the main surface of the front case 101. The audio output unit 152 and the camera 121 are arranged in a region proximate to one end of the display module 151 and the user input unit 130-1 and the microphone 122 are located in a region proximate to the other end of the display module 151. The user input unit 130-2 and the interface unit 170 are arranged on the sides of the front case 101 and the rear case 102.

The user input unit 130 is operated to receive commands for controlling the operation of the mobile terminal 100 and may include a plurality of operating units 130-1 and 130-2. The operating units 130-1 and 130-2 can be referred to as manipulating portions and employ any tactile manner in which a user operates the operating units 130-1 and 130-2 while having a tactile feeling.

First and second operating units 130-1 and 130-2 can receive various inputs. For example, the first operating unit 130-1 receives commands such as start, end and scroll and the second operating unit 130-2 receives commands for controlling the volume of sound output from the audio output unit 152 or converting the display module 151 to a touch recognition mode.

Figure 2B:
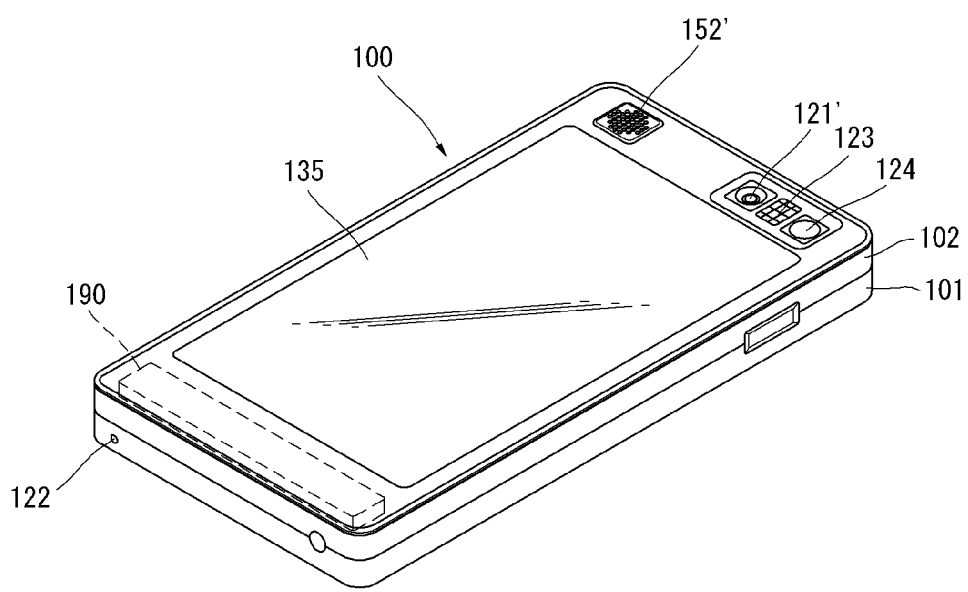
FIG. 2B is a rear perspective view of a mobile terminal according to an embodiment of the present invention.

FIG. 2B is a rear perspective view of the mobile terminal 100 shown in FIG. 2A according to an embodiment of the present invention. Referring to FIG. 2A, a camera 121' can be additionally attached to the rear side of the terminal body, that is, the rear case 102. The camera 121' has a photographing direction opposite that of the camera 121 shown in FIG. 2A and may have a pixel resolution different from that of the camera 121 shown in FIG. 2A.

For example, the camera 121 may have a lower pixel resolution such that it can efficiently capture an image of a user's face and transmit the image to a receiver during video telephony while the camera 121' may have a higher pixel resolution to capture a high quality image of a general object during normal photography. The cameras 121 and 121' can be attached to the terminal body in a rotatable or pop-up configuration.

A flash bulb 123 and a mirror 124 are additionally arranged in proximity to the camera 121'. The flash bulb 123 lights an object when the camera 121' takes a picture of the object. The mirror 124 is used by the user to look at his/her face during self-photography using the camera 121'.

An audio output unit 152' can be additionally provided on the rear side of the terminal body. The audio output unit 152' can provide a stereo function in combination with the audio output unit 152 shown in FIG. 2A and facilitate a speaker phone mode when the mobile terminal 100 is used to make telephone call.

A broadcast signal receiving antenna can be additionally attached to the side of the terminal body in addition to an antenna for telephone calls. The antenna constituting a part of the broadcast receiving module 111 shown in FIG. 1 can be set in the terminal body such that the antenna can be pulled out of the terminal body.

The power supply 190 for providing power to the mobile terminal 100 is set in the terminal body. The power supply 190 can be included in the terminal body or detachably attached to the terminal body.

A touch pad 135 for sensing touch can be additionally attached to the rear case 102. The touch pad 135 can be of a light transmissive type as the display module 151. In this case, if the display module 151 outputs visual information through both sides thereof, the visual information can be recognized through the touch pad 135. The information output through both sides of the display module 151 can be controlled by the touch pad 135. Otherwise, a display is additionally attached to the touch pad 135 such that a touch screen can be arranged in the rear case 102.

The touch pad 135 operates in connection with the display module 151 of the front case 101. The touch pad 135 can be located in parallel with the display module 151 behind the display module 151. The touch panel 135 may be identical to or smaller than the display module 151 in size.

Figure 3:
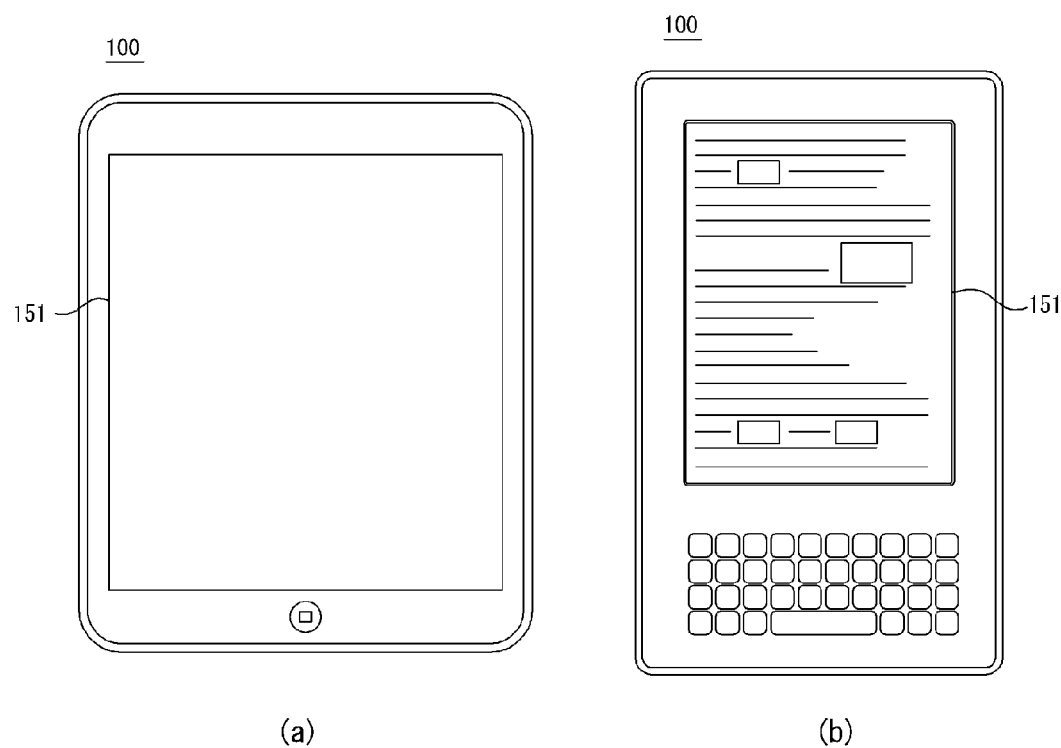
FIG. 3 illustrates a mobile terminal according to another embodiment of the present invention.

Referring to FIG. 3(a), the mobile terminal 100 may be a tablet device. The tablet device may receive an input from a user through a touch of the large-screen display module 151 and the tablet device may not have a physical keyboard. Referring to FIG. 3(b), the mobile terminal 100 may be an e-book reader capable of displaying an electronic book or e-book.

Figure 4:
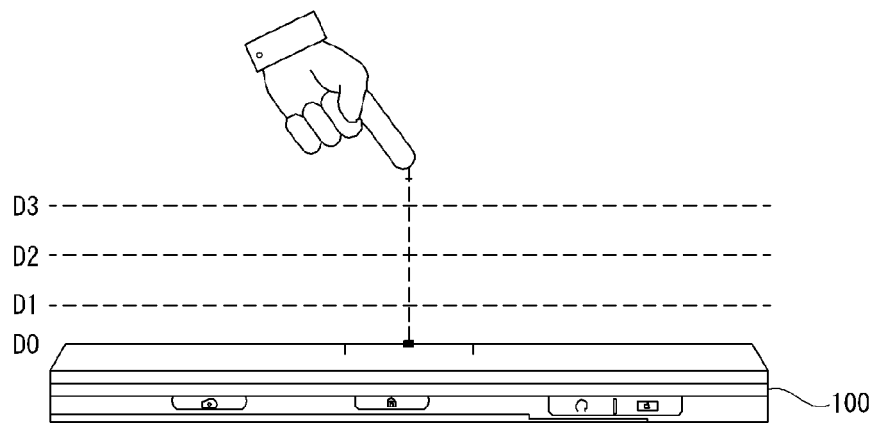
FIG. 4 is a diagram illustrating a proximity depth of a proximity sensor of a mobile terminal according to an embodiment of the present invention.

FIG. 4 illustrates a proximity depth of the proximity sensor 141. As shown in FIG. 4, when a pointer such as a user's finger approaches the touch screen, the proximity sensor 141 located inside or near the touch screen senses the approach and outputs a proximity signal.

The proximity sensor 141 may be constructed such that it outputs a proximity signal according to the distance between the pointer approaching the touch screen and the touch screen (referred to as "proximity depth"). The distance in which the proximity signal is output when the pointer approaches the touch screen is referred to as a detection distance. The proximity depth can be measured by using a plurality of proximity sensors 141 having different detection distances and comparing proximity signals respectively output from the plurality of proximity sensors 141.

FIG. 4 shows a sectional view of the touch screen in which proximity sensors 141 capable of sensing three different proximity depths are arranged. Unlike the disclosure in FIG. 4, proximity sensors 141 capable of sensing less than or more than three proximity depths may be arranged in the touch screen.

Specifically, when the pointer directly contacts with touch screen (D0), a contact touch is recognized. When the pointer is positioned within distance D1 from the touch screen, a proximity touch of a first proximity depth is recognized. When the pointer is positioned in a range between distance D1 and distance D2 from the touch screen, a proximity touch of a second proximity depth is recognized. When the pointer is positioned in a range between distance D2 and distance D3 from the touch screen, a proximity touch of a third proximity depth is recognized. When the pointer is positioned farther than distance D3 from the touch screen, no proximity touch is detected by the proximity sensor 141. Accordingly, the controller 180 can recognize the proximity touch as various input signals according to the proximity distance and proximity position of the pointer with respect to the touch screen and perform various operation controls according to the input signals.

Figure 5:
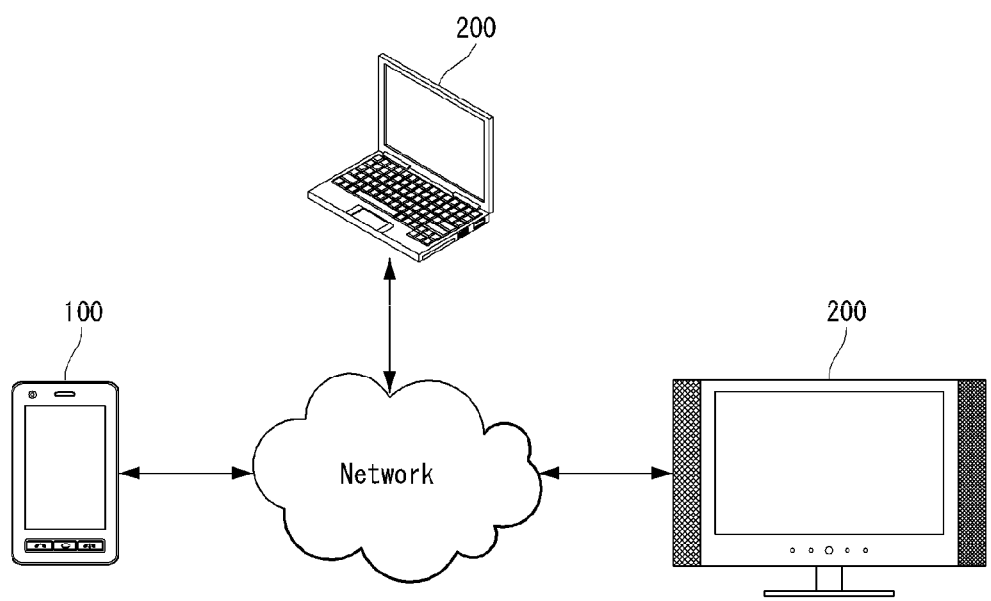
FIG. 5 illustrates a service network related to the mobile terminal shown in FIG. 1.

FIG. 5 illustrates a service network relating to an embodiment of the present invention, through which electronic devices share contents. Referring to FIG. 5, the mobile terminal 100 is connected to one or more external electronic devices 200 having a display function through a network, and transmits contents to the external electronic devices 200 such that the external electronic devices 200 may display the contents received from the mobile terminal 100. Or the mobile terminal 100 may also receive contents from the external electronic devices 200 and display the received contents on the display module 151, thus sharing the contents with the external electronic devices 200.

For example, the mobile terminal 100 may be a cellular phone and the external electronic devices 200 may be a television receiver and a laptop computer as shown in FIG. 5. However, the present invention is not limited to the disclosure of FIG. 5. The mobile terminal 100 and the external electronic devices 200 may include a cellular phone, a television receiver, a laptop computer, a smart phone, a digital broadcasting terminal, a personal digital assistant (PDA), a portable multimedia player (PMP), a navigation system, a desktop computer, a set-top box, a personal video recorder (PVR), a digital photo frame, and the like.

Referring back to FIG. 5, to share contents between the mobile terminal 100 and the external electronic devices 200, a platform of the mobile terminal 100 and the external electronic devices 200 should be established such that the mobile terminal 100 and the external electronic devices 200 can interoperate. To achieve this, the mobile terminal 100 and the electronic devices 200 can construct a platform based on a digital living network alliance (DLNA) platform.

According to DLNA, IPv4 can be used as a network stack and Ethernet, wireless local network (WLAN) (802.11a/b/g), wireless fidelity (Wi-Fi), Bluetooth® and other IP connectable communication methods can be used for network connectivity. Furthermore, an electronic device can be discovered and controlled based on a universal plug and play (UPnP) protocol, particularly, UPnP AV architecture and UPnP device architecture. For example, simple service discovery protocol (SSDP) can be used to discover an electronic device. Furthermore, simple object access protocol (SOAP) can be used to control the electronic device.

Further, according to DLNA, hypertext transfer protocol (HTTP) and real-time transport protocol (RTP) can be used to transmit media, and JPEG, LPCM, MPEG2, MP3, MPEG4, and the like can be used as media formats. Moreover, DLNA can support a digital media server (DMS), a digital media player (DMP), a digital media renderer (DMR) and a digital media controller (DMC).

Figure 6:
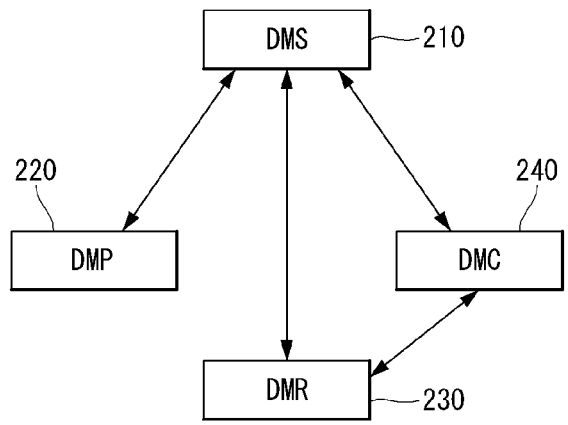
FIG. 6 is a diagram of a digital living network alliance (DLNA) network.

FIG. 6 illustrates the DLNA. The DLNA is a representative title of a standardization organization developing technological standards for electronic devices to share contents such as music, moving pictures and still images through a network. The DLNA is based on the UPnP protocol.

Referring to FIG. 6, the DLNA network may include a DMS 210, a DMP 220, a DMR 230 and a DMC 240. The DLNA may include one or more DMSs 210, one or more DMPs 220, one or more DMRs 230 and one or more DMCs 240. The DLNA can provide standards for interoperability of DMSs 210, for interoperability of DMPs 220, for interoperability of DMRs 230 and for interoperability of DMCs 240. In addition, the DLNA network can provide standards for interoperability of the DMS 210, DMP 220, DMR 230 and DMC 240.

The DMS 210 can provide digital media contents. That is, the DMS 210 can store and manage contents. The DMS 210 can receive commands from the DMC 240 and execute the commands. For example, the DMS 210 searches for contents to be played and provides the contents to the DMR 230 upon receiving a play command. The DMS 210 may include a computer, a PVR and a set-top box, for example.

The DMP 220 can control contents or electronic devices and play contents. That is, the DMP 220 can perform a play function of the DMR 230 and a control function of the DMC 240. The DMP 220 may include a television set (TV), a digital television (DTV) and a home theater, for example. The DMR 230 can play contents received from the DMS 210. The DMR 230 may include a digital photo frame. The DMC 240 can provide the control function. The DMC 240 may include a cellular phone and PDA, for example.

The DLNA network may comprise the DMS 210, DMR 230 and DMC 240, or the DMP 220 and the DMR 230. The DMS 210, DMP 220, DMR 230 and DMC 240 are terms for functionally classifying electronic devices. For example, a cellular phone corresponds to the DMP 220 when the cellular phone has a play function in addition to a control function. A digital television (DTV) may correspond to the DMP 220 and DMS 210 when the DTV manages contents.

Figure 7:
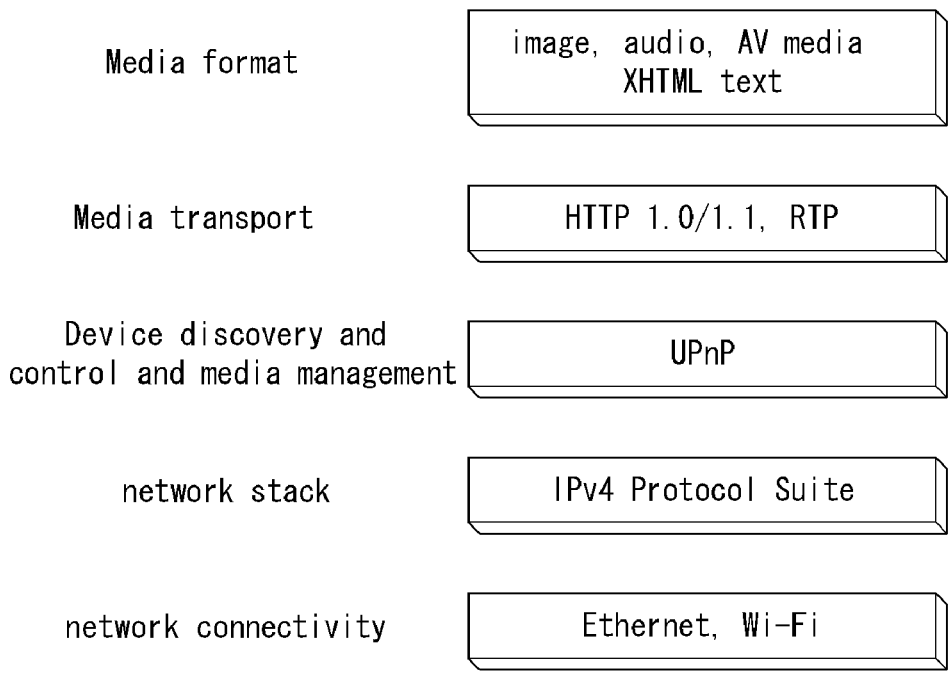
FIG. 7 illustrates functional layers of a DLNA.

FIG. 7 illustrates functional components according to DLNA. Functional components may include a media format layer, a media transport layer, a device discovery and control and media management layer, a network stack layer and a network connectivity layer.

The network connectivity layer may include a physical layer and a link layer. The network connectivity layer may include Ethernet, Wi-Fi and Bluetooth®. The network connectivity layer may use IP connectable communication media.

The network stack layer may use an IPv4 protocol. The device discovery and control and media management layer may be based on UPnP AV architecture and UPnP device architecture. For example, the simple service discovery protocol (SSDP) can be used for device discovery. Further, the simple object access protocol (SOAP) can be used for control.

The media transport layer can use HTTP 1.0/1.1 for streaming. In addition, the media transport layer can use real-time transport protocol (RTP). The media format layer can use images, audio, AV media, and extensible hypertext markup language (XHTML) texts.

Figure 8:
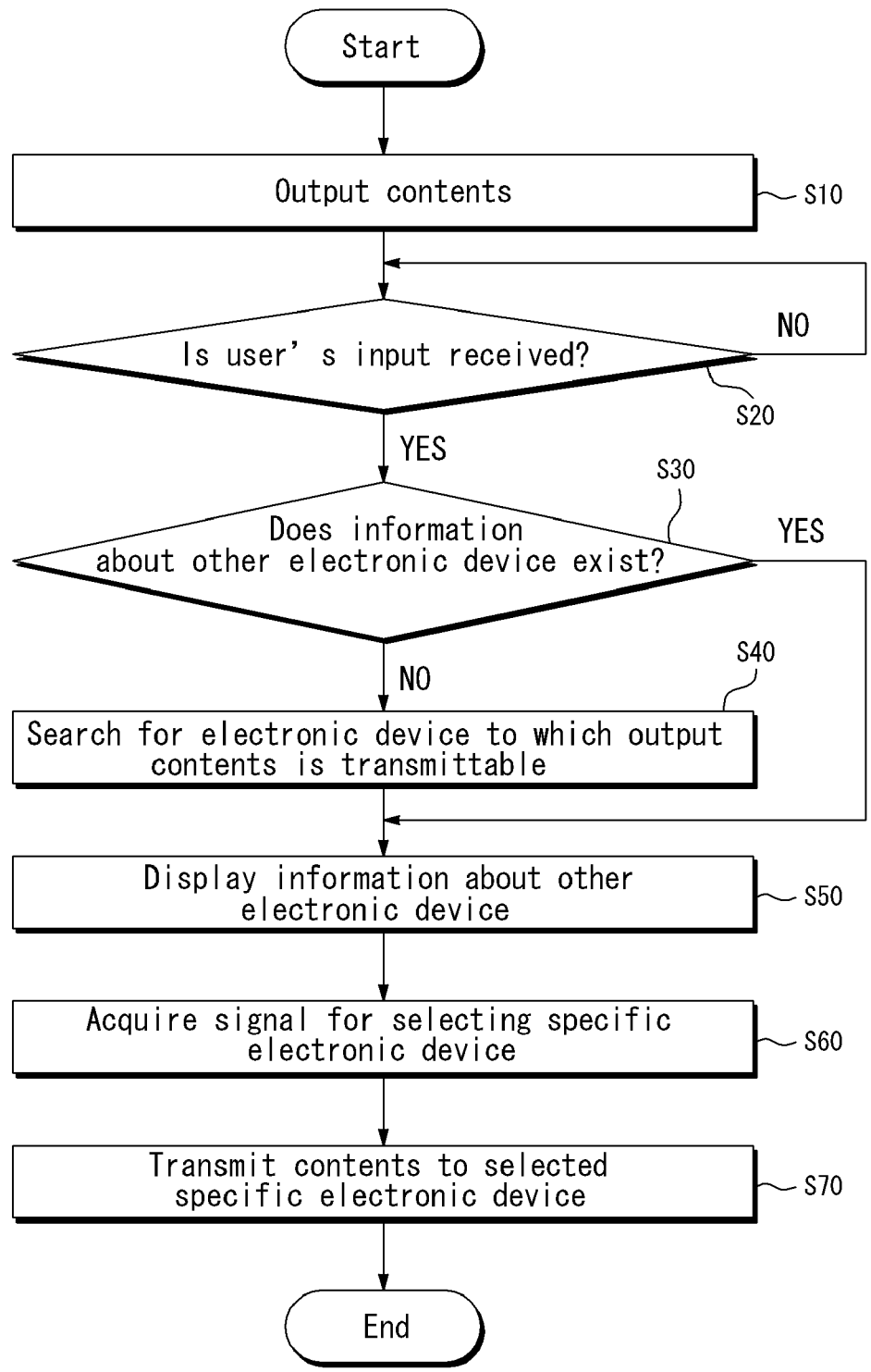
FIGS. 8 and 9 are flowcharts illustrating controlling a mobile terminal according to an embodiment of the present invention.
Figure 9:
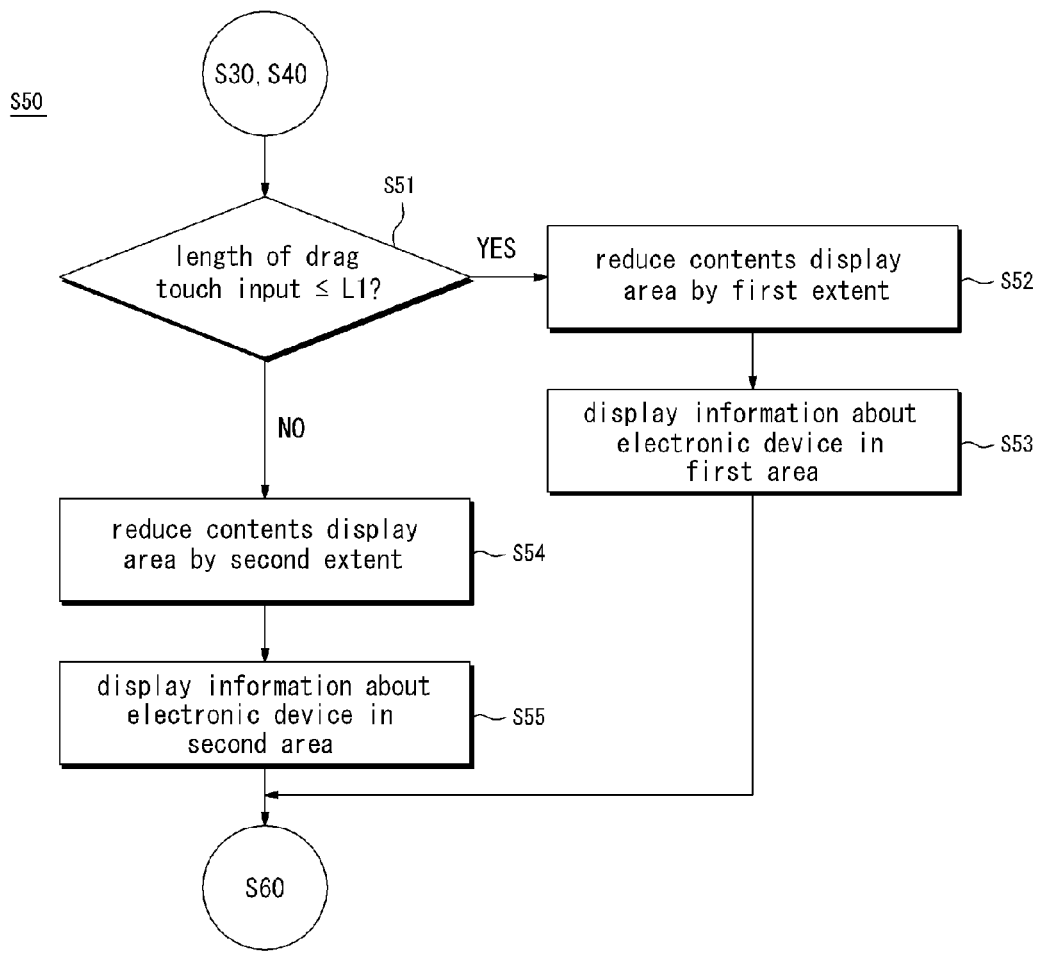

FIGS. 8 and 9 are flowcharts illustrating how the mobile terminal 100 is controlled according to an embodiment of the present invention. The mobile terminal 100 can effectively display information about other electronic devices 200. Accordingly, the mobile terminal 100 can easily exchange contents with other electronic devices 200.

Referring to FIG. 8, the controller 180 of the mobile terminal 100 outputs contents (S10). The contents may be video or audio information that can be output from the mobile terminal 100. For example, the contents include moving pictures, still images, web pages and various texts. The contents may be stored in the memory 160 or received through the wireless communication unit 110.

The contents may also include visually recognizable information, aurally recognizable information and tactile-recognizable information. The tactile-recognizable information may be vibration information that can generate a haptic effect. For example, when vibration information is included in a specific part of a moving picture, the controller 180 may operate the haptic module 154 to create a vibration effect. The aurally recognizable information may be sounds including voices. The aurally recognizable information can be output through the audio output module 152. The visually recognizable information can be displayed through the display module 151. Information displayed through the display module 151 may be displayed on the entire area of the display module 151 to be effectively transmitted.

The controller 180 determines whether a user's input is received while the contents are output (S20). The user's input may be generated in various modes. For example, the user's input is generated when a specific physical button included in the mobile terminal 100 is touched or pushed. Alternatively, the user's input may be a touch input applied to the display module 151, and the following description will be made on the assumption that the user's input is a touch input applied to the display module 151. However, the present invention is not limited to the touch input.

When the user's input is received, the controller 180 determines whether information about other electronic devices 200 exists (S30). The other electronic devices 200 may include an external device which can communicate with the mobile terminal 100 in a wired or wireless manner. For example, the other electronic device 200 may be a TV, a computer, a projector, an audio system or another mobile terminal. The mobile terminal 100 and the other electronic device 200 can exchange information with each other according to the DLNA protocol as described above.

The information about the other electronic device 200 may include a type of the other electronic device 200, a status of communication between the mobile terminal 100 and the other electronic device 200 and information about contents currently output at the other electronic device 200. The information about the other electronic device 200 can be acquired before the mobile terminal 100 receives the user's input. For example, the information about the other electronic device 200 can be searched when the mobile terminal 100 is in an idle state. Moreover, the information about the other electronic device 200 might have been already acquired through a previous communication between the mobile terminal 100 and the other electronic device 200. That is, the controller 180 of the mobile terminal 100 can store the information about the other electronic device 200 previously connected to the mobile terminal 100 in the memory 160. The controller 180 may store the information about the other electronic device 200 with specific position information of the mobile terminal 100. Accordingly, the information about the other electronic device 200 can be automatically loaded and used when the mobile terminal 100 is in a specific position.

When the information about the other electronic device 200 does not exist, the controller 180 may search for another electronic device 200 to which the output contents will be transmitted (S40). The other electronic device 200 may be searched such that a predetermined signal is transmitted through the wireless communication unit 110 of the mobile terminal 100 to locate an electronic device 200 responding to the signal.

When the information about the other electronic device 200 exists or the other electronic device 200 has been searched, the information about the other electronic device 200 may be displayed (S50). The information about the other electronic device 200 may be displayed such that the user can clearly recognize the information and easily select the other electronic device 200 based on the displayed information. Displaying the information about the other electronic device 200 will be explained in more detail with reference to FIG. 9.

Referring to FIG. 9, displaying the information about the other electronic device 200 may include determining whether or not the length of a drag touch is shorter than a preset length L1 or a predetermined reference length (S51). The drag touch may be a user's touch-and-drag input applied to the display module 151 which includes a touch screen. When the drag touch is received, the controller 180 determines the length of the drag touch.

In particular, the controller 180 may determine whether the length of the drag touch is equal to or shorter than L1. When the length of the drag touch is equal to or shorter than L1, the contents display area is reduced by a first extent (S52) and the information about the other electronic devices 200 is displayed at a first area of the display module 151.

In response to the drag touch, the size of contents being displayed on the display module 151 may be reduced. The contents display size can be reduced with respect to a specific point of the display module 151. For example, the length and width of an area displaying the contents can be reduced with respect to the center point of the display module 151. When the display size of the contents is reduced, at least one area will be formed around the reduced contents display area. The controller 180 may display the information about the other electronic device 200 in the at least one formed area. If the length of the drag touch is equal to or shorter than L1, the contents display area can be reduced by the first extent corresponding to a first preset size.

When the length of the drag touch is greater than L1 (S51), the contents display area may be reduced by a second extent (S54) and the information about the other electronic device 200 may be displayed on a newly formed area around the contents display area (S55). The length of the drag touch will be greater than L1 when the user performs a longer drag touch on the display module 151, and the controller 180 determines that the longer drag touch is for reducing the contents display area by the second extent, and reduces the contents display area accordingly. Compared to the reduction of the contents display area by the first extent, the reduction by the second extent increases the size or number of the newly formed area or areas for displaying the information about the other electronic device 200. Thus, more information can be displayed on the newly formed area when the contents display area is reduced by the second extent compared to the contents display area reduced by the first extent. That is, the second area may be larger than the first area.

Referring back to FIG. 8, when the information about the other electronic device 200 is displayed (S50), a signal for selecting the specific electronic device 200 may be received (S60) and the contents may be transmitted to the selected electronic device in response to the signal (S70). The signal for selecting the specific electronic device 200 may be generated in response to the touching of the displayed information about the other electronic device 200. That is, when the user touches the displayed information about the other electronic device 200 with a finger, the controller 80 may recognize that the electronic device 200 is selected.

When the specific electronic device 200 is selected, the contents can be transmitted to the selected electronic device 200. The contents transmitted to the other electronic device 200 may be contents currently being output from the mobile terminal 100. When the contents are transmitted to the other electronic device 200, the mobile terminal 100 may interrupt the outputting of the contents.

Contents output operations by the mobile terminal 100 will be described referring to FIGS. 10-17. The mobile terminal 100 may display various contents on the display module 151, and the following description will be made, assuming that the contents correspond to a web page WP.

Figure 10:
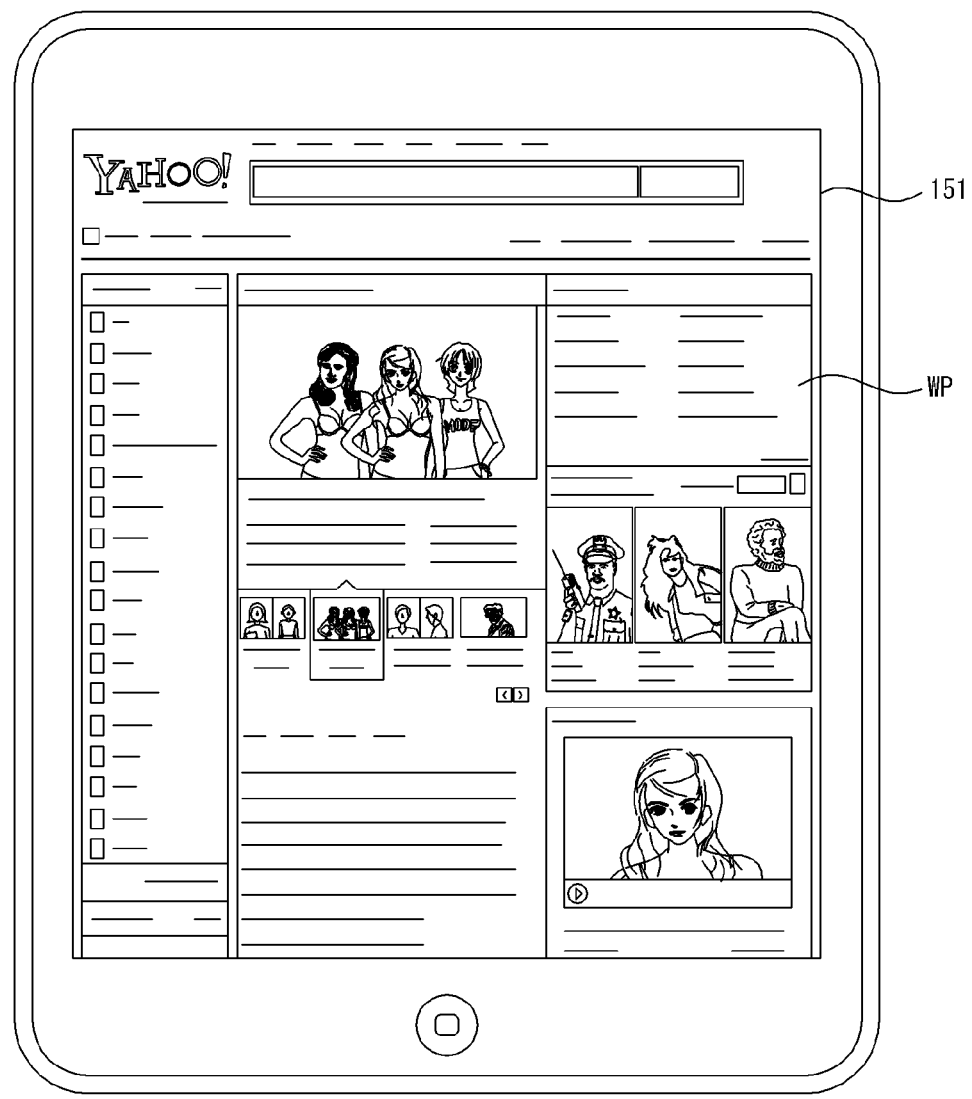
FIGS. 10-17 illustrate a contents outputting operation of a mobile terminal according to an embodiment of the present invention.

Referring to FIG. 10, the display module 151 may display a web page WP. The web page WP may be displayed on the entire screen of the display module 151.

Figure 11:
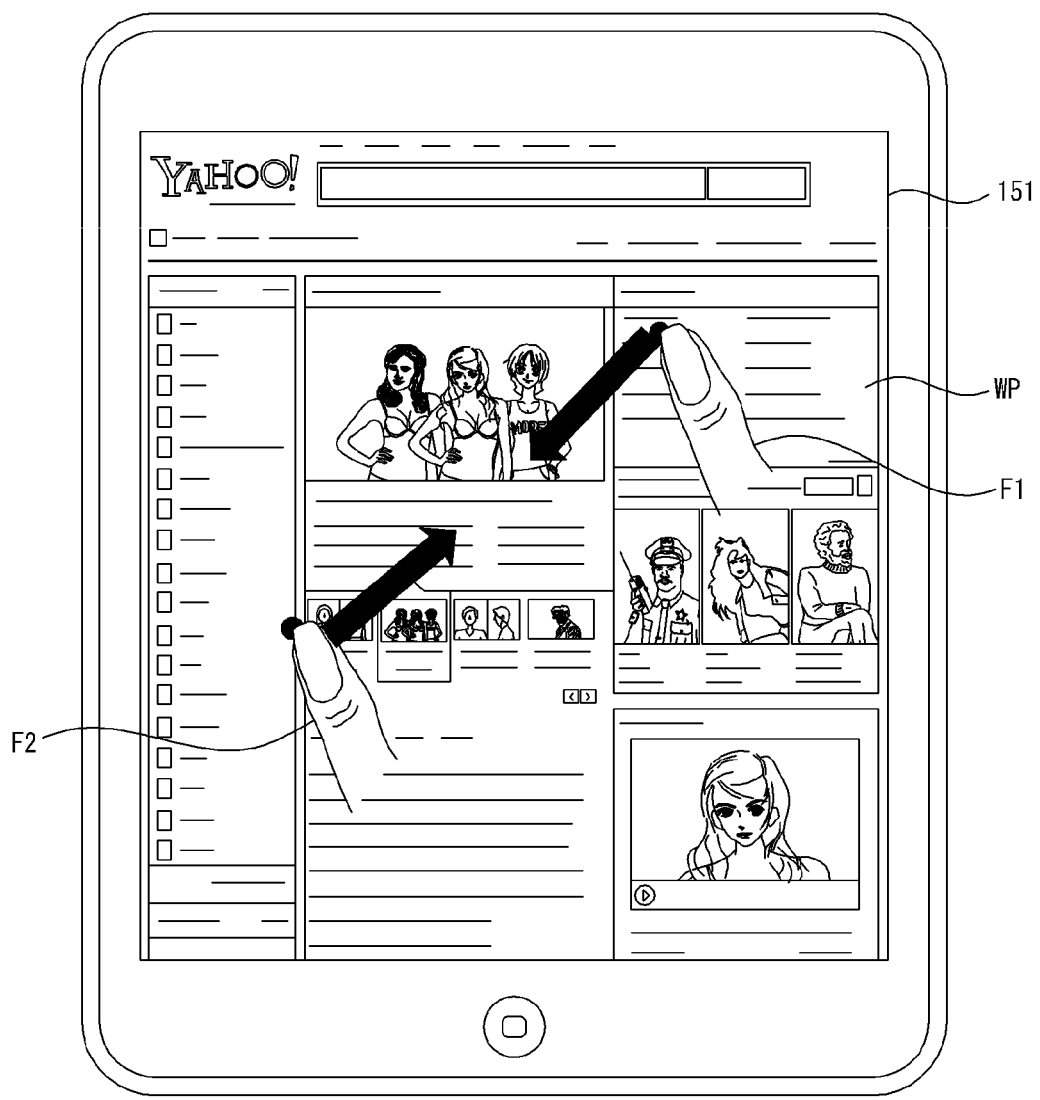

Referring to FIG. 11, the user can drag-touch the display module 151, for example, touching the display screen with first and second fingers F1 and F2. That is, the user may drag-touch the display module 151 such that the first and second fingers F1 and F2 in contact with the display screen approach each other. The dragging length of the first and second fingers F1 and F2 can be a standard for determining a reducing area of the web page WP, which will be later described in detail.

Figure 12:
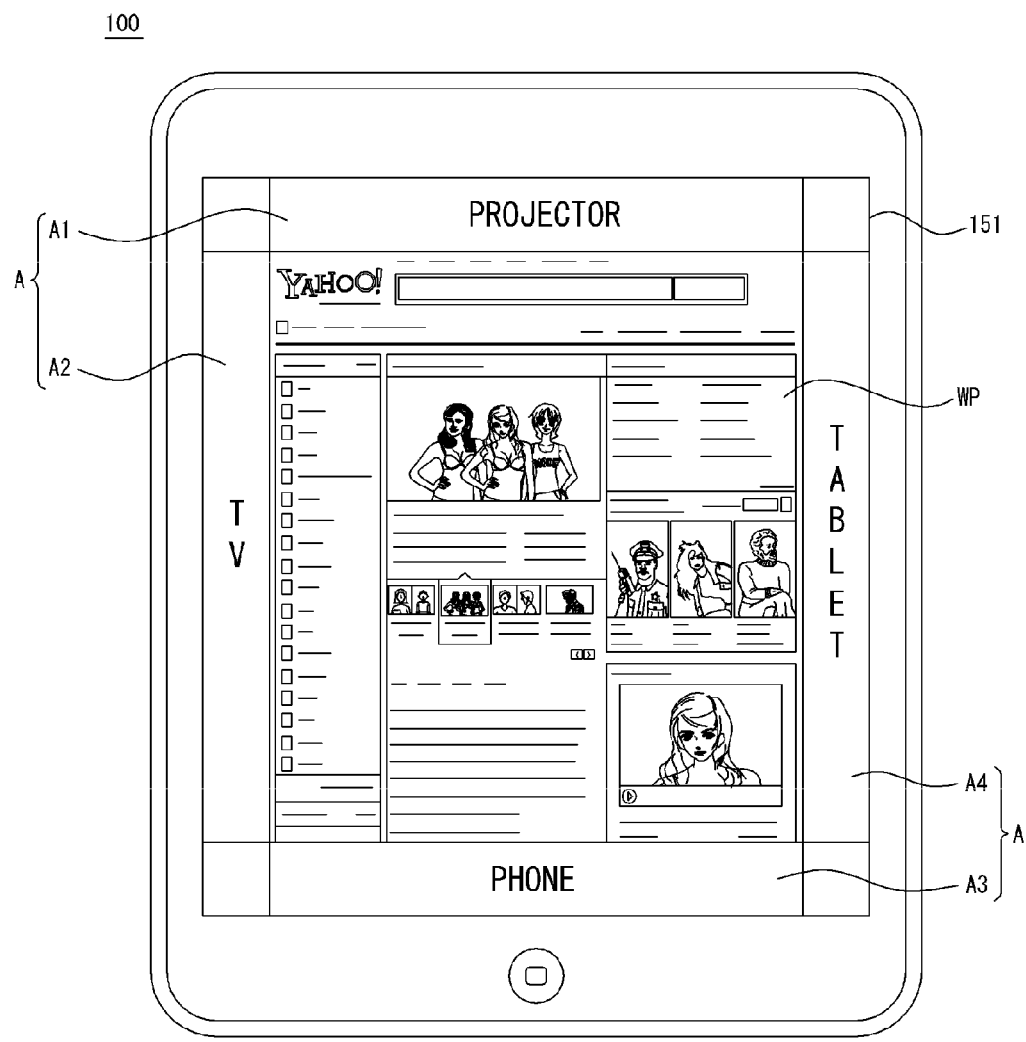

Referring to FIG. 12, the controller 180 may reduce the display area of the web page WP in response to the user's drag-and-touch operation exemplified in FIG. 11. When the display area of the web page WP is reduced, a first area A of the display module 151 can be formed on the display module 151. That is, each side edge of the web page WP displayed on the display screen moves closer to the center point of the display module 151, and thus, the first area A is formed around the displayed web page WP. The first area A may display first, second, third and fourth information items A1, A2, A3 and A4.

The first, second, third and fourth information items A1, A2, A3 and A4 may be information about other electronic devices 200 that can communicate with the mobile terminal 100, or information about other electronic devices 200 that can exchange contents with the mobile terminal 100 using a DLNA communication method. For example, the first information A1 indicates that a specific projector can communicate with the mobile terminal 100 and the second information A2 indicates that a specific TV can communicate with the mobile terminal 100. The third information A3 indicates that a specific phone can communicate with the mobile terminal 100 and the fourth information A4 indicates that a specific tablet device can communicate with the mobile terminal 100.

The information about the other electronic devices 200 that can communicate with the mobile terminal 100 is directly displayed on the display module 151 through a simple touch operation, and thus, the user can select a desired electronic device 200 easily and conveniently.

Figure 13:
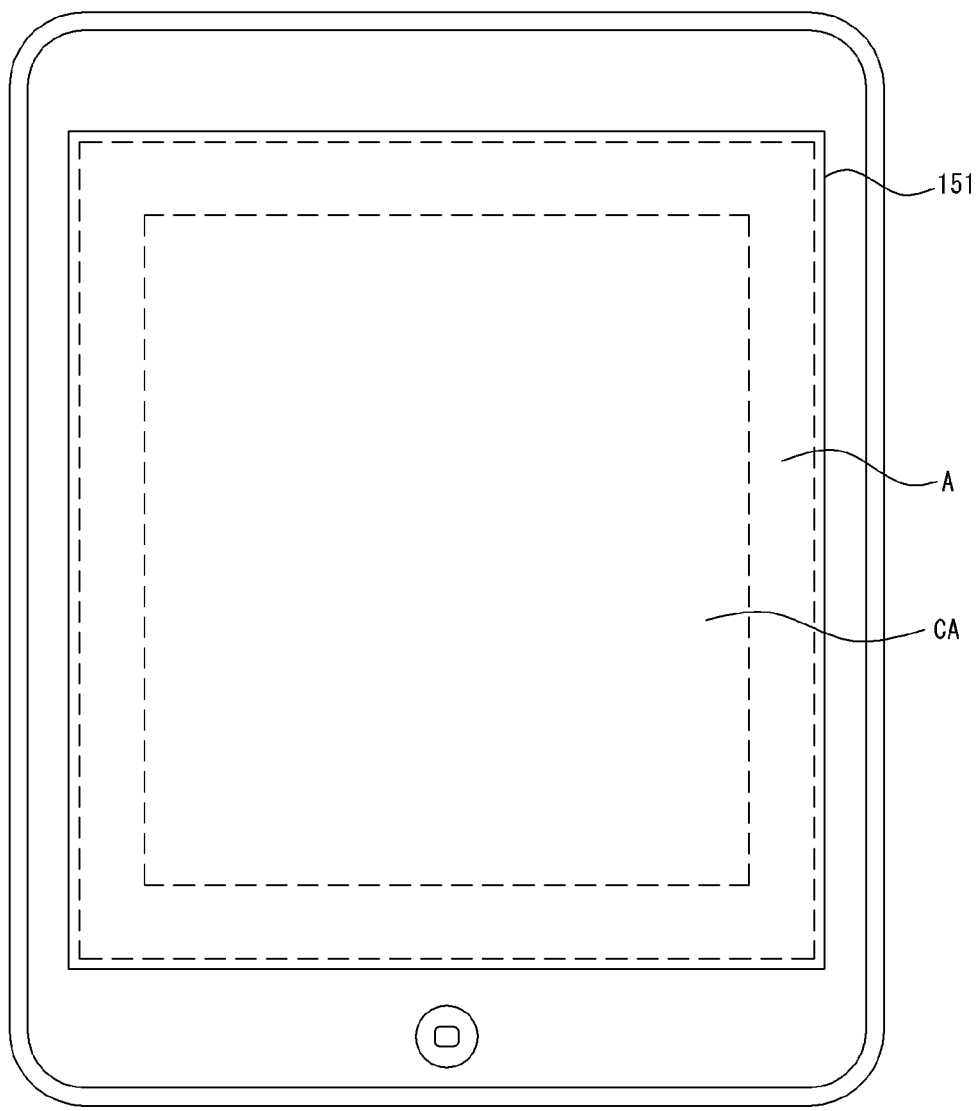

Referring to FIG. 13, the display screen of the display module 151 may be divided into the first area A and a contents area CA. The first area A is obtained when the contents display area is reduced and displays the information about the other electronic devices 200 and the contents area CA displays the contents having a reduced display size. The first area A may correspond to edge regions of the display screen of the display module 151 and the contents area CA may correspond to the central region of the display screen.

Figure 14:
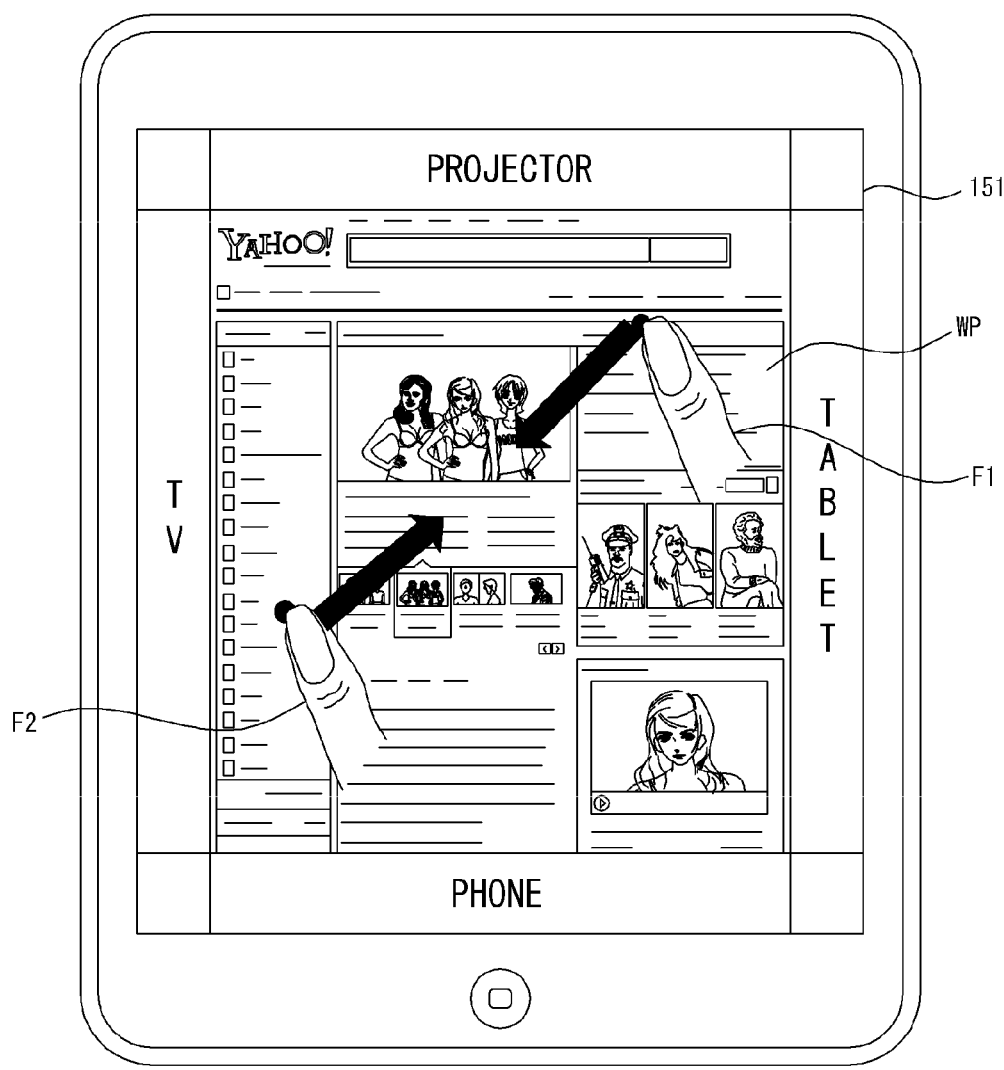

Referring to FIG. 14, the user may multi-touch the display screen of the display module 151 displaying the web page WP having a reduced display size using the first and second fingers F1 and F2. Here, the multi-touch may be a drag touch bringing the first and second fingers F1 and F2 closer to each other.

Figure 15:
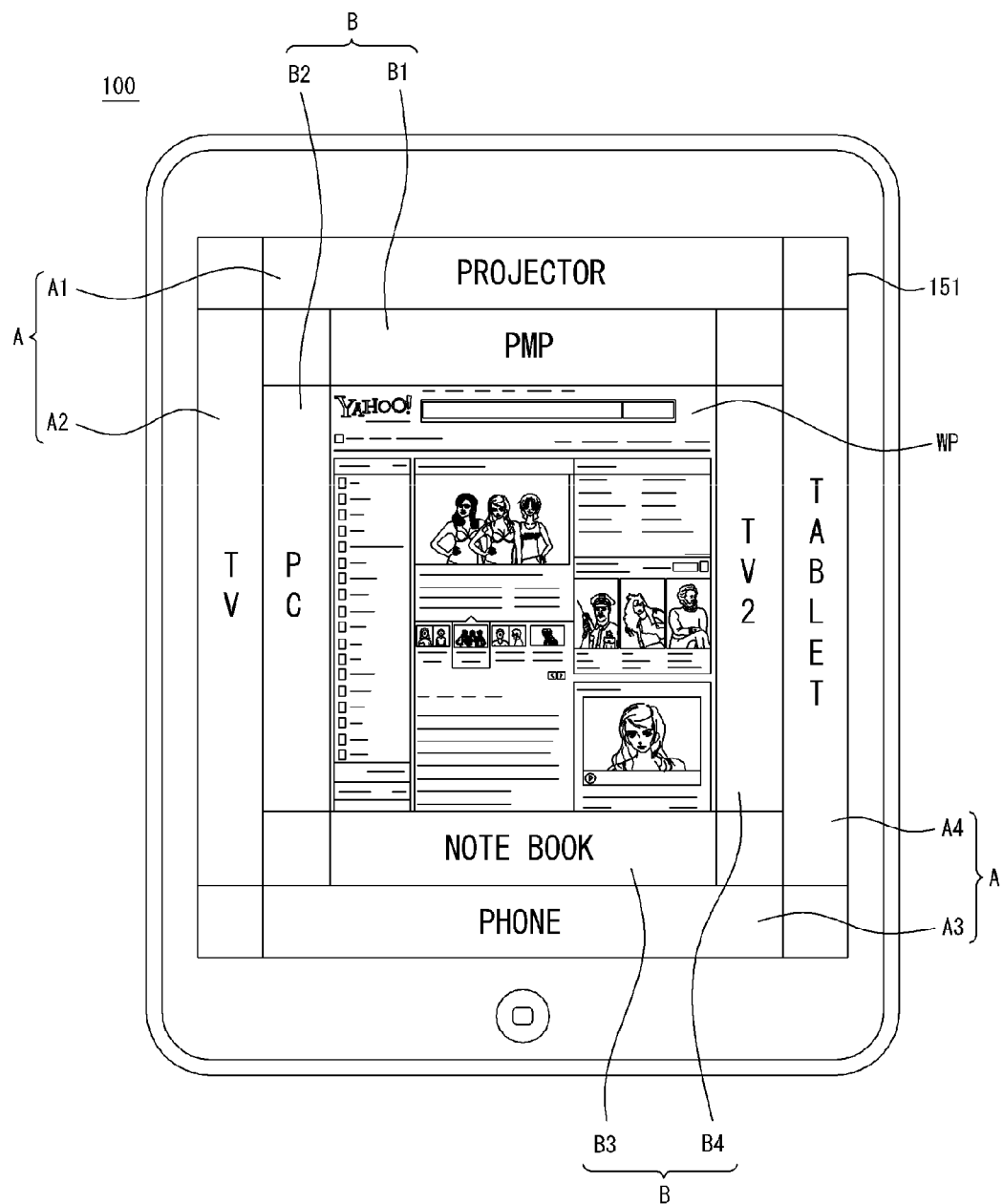

Referring to FIG. 15, when the multi-touch is received as shown in FIG. 14, the controller 180 can further reduce the display area of the web page WP. When the web page WP is reduced, a second area B is formed on the display module 151.

The second area B may display fifth, sixth, seventh and eighth information items B1, B2, B3 and B4 which correspond to information about additional electronic devices 200 which are not represented by the first, second, third information items A1, A2, A3 and A4. That is, when the mobile terminal 100 can communicate with more than four electronic devices 200, information about an electronic device 200, which cannot be displayed in the first area A, can be displayed in the second area B. The first and second areas A and B may be referred to as a first layer and a second layer, respectively.

The first and second areas A and B, which are obtained as the display area of the web page WP is sequentially reduced, display information about the other electronic devices 200, and thus, the user can confirm the information about a plurality of other electronic devises 200 conveniently. That is, the information about the other electronic devices 200 may be displayed while the display module 151 displays the web page WP, and at least one desired electronic device 200 may be selected without using a complicated process of displaying an additional pop-up window and selecting a menu displayed on the pop-up window.

Figure 16:
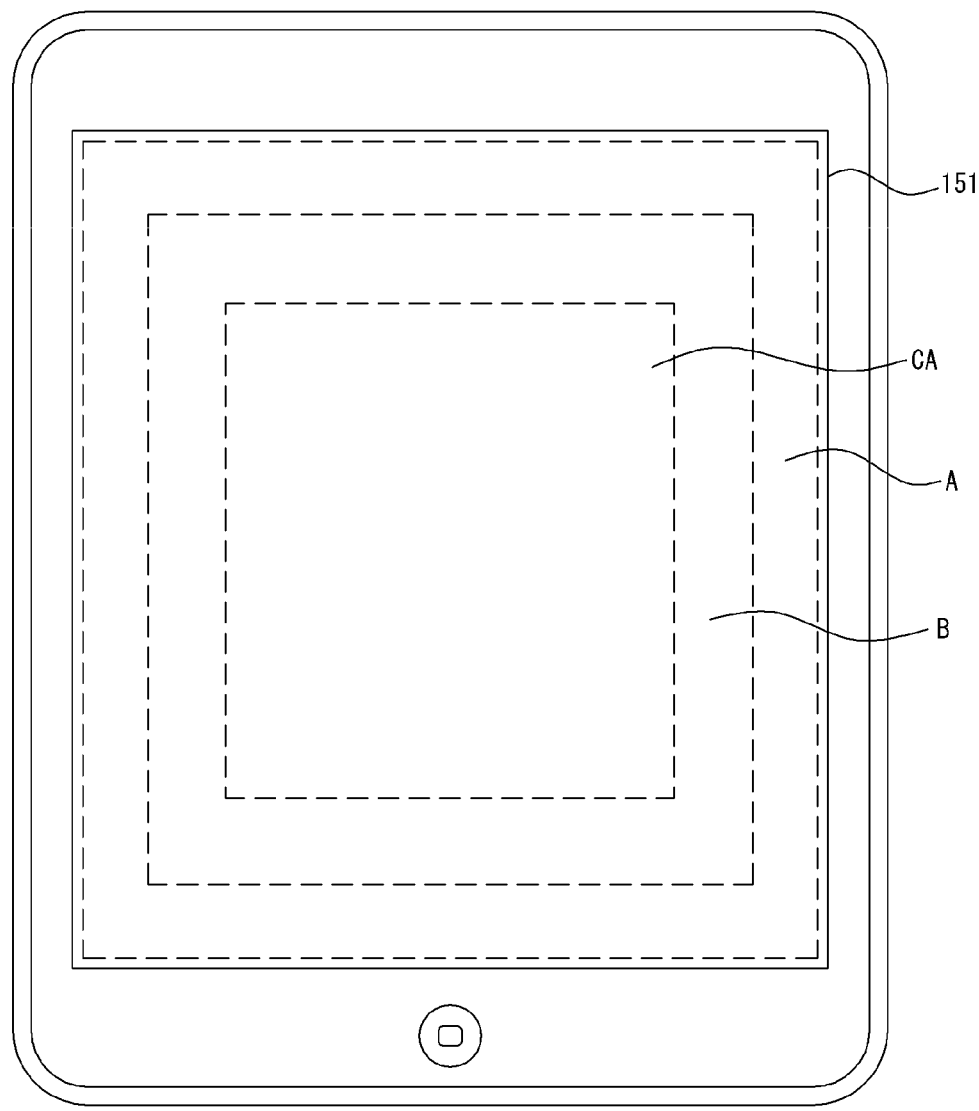

Referring to FIG. 16, the display screen of the display module 151 may be divided into the first area A, the second area B and the contents area CA. The first area A is formed when the user performs the first multi-touch drag and the second area B may be formed when the user performs the second multi-touch drag while the first area A is displayed. Alternatively, the second area B can also be formed even when the first area A is not formed yet, and when the length of a multi-touch drag is longer than a predetermined length. That is, only the first area A is formed when the length of a multi-touch drag is equal to or shorter than the predetermined length and both the first and second areas A and B may be formed together when the length of a multi-touch drag is longer than the predetermined length.

Figure 17:
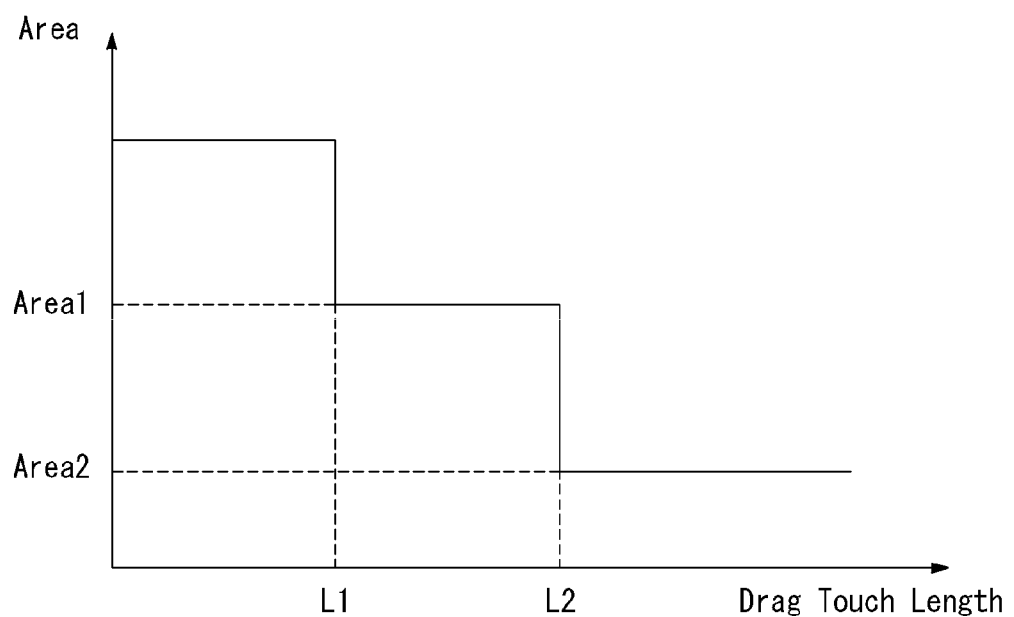

Referring to FIG. 17, a secured area may depend on a length of the multi-touch drag. In FIG. 17, the horizontal axis represents the drag touch length and the vertical axis represents a variation in the contents area CA. When the user's multi-touch drag length exceeds L1, the contents area CA corresponds to Area1. When the user's multi-touch drag length is longer than L2, the contents area CA corresponds to Area2. That is, the size of the contents area CA decreases, and the size or number of an area or areas capable of displaying the information about the other electronic devices 200, for example, areas A and B discussed above, increases as the length of the multi-touch drag increases.

A contents transmitting operation of the mobile terminal 100, as disclosed in S70 of FIG. 8, will be described referring to FIGS. 18-21. The mobile terminal 100 can transmit the contents to the other electronic device 200 in response to an operation for selecting the other electronic device 200.

Figure 18:
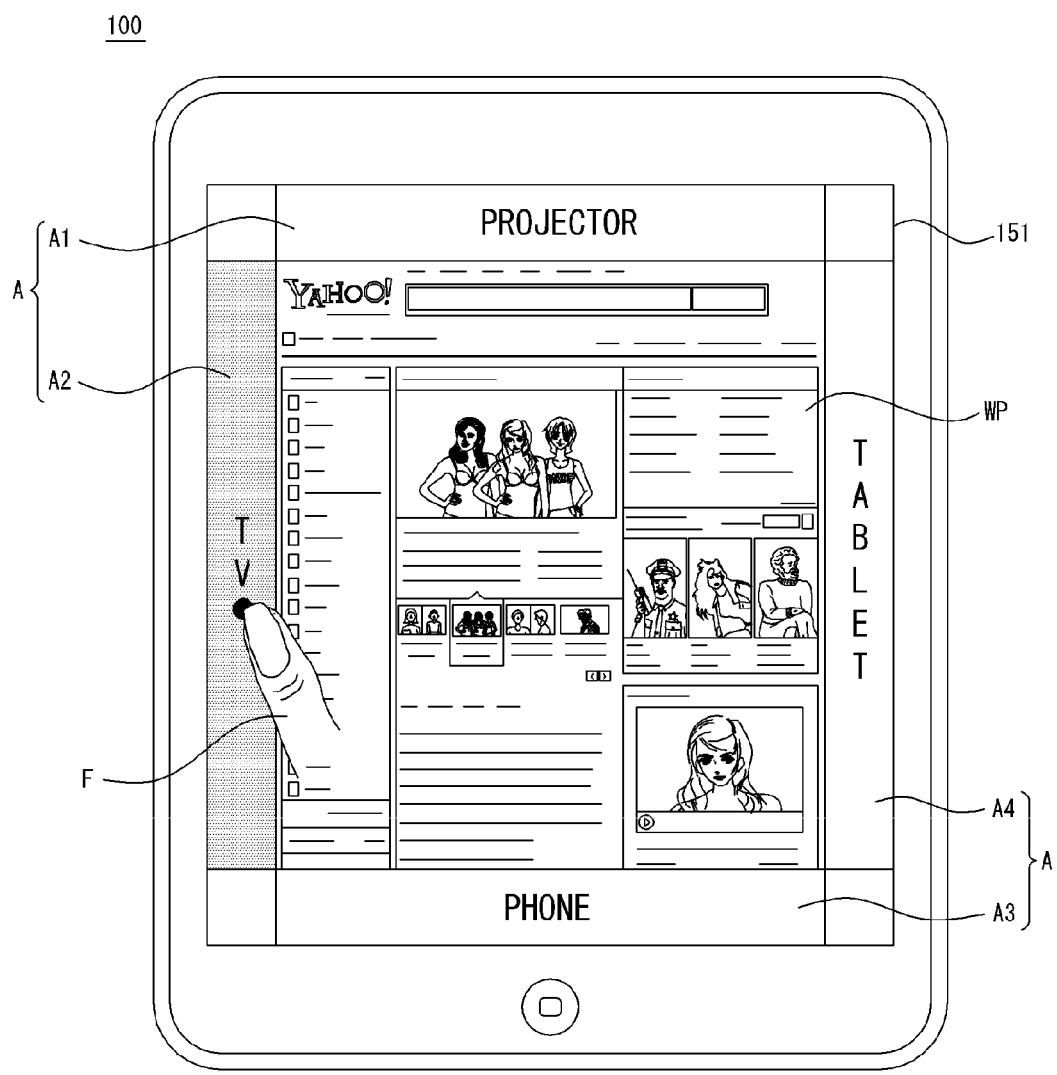
FIGS. 18-21 illustrate a contents transmitting operation of a mobile terminal according to an embodiment of the present invention.

Referring to FIG. 18, the first area A may display the information about the other electronic devices 200. Moreover, the user may touch a second information area A2 in the first area A using a finger F. The second information area A2 may display information about a TV among other electronic devices 200.

Figure 19:
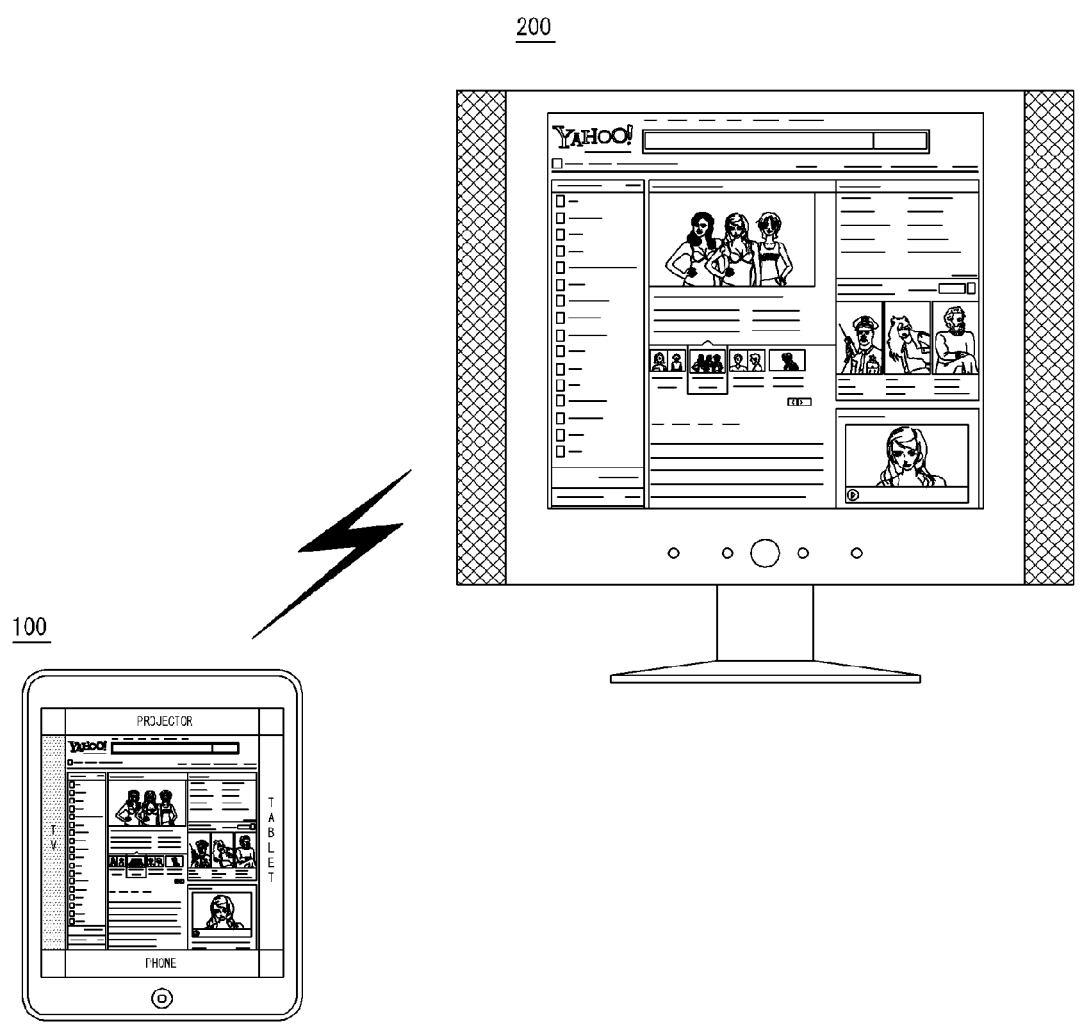

Referring to FIG. 19, when the TV receiver 200 is selected in response to the touch input shown in FIG. 18, the controller 180 can transmit the contents, i.e., the web page WP, to the TV 200. Thus, the TV 200 can display the contents received from the mobile terminal 100. The contents can be directly transmitted from the mobile terminal 100 to the electronic device 200 or transmitted to the electronic device 200 through the DLNA technique.

Figure 20:
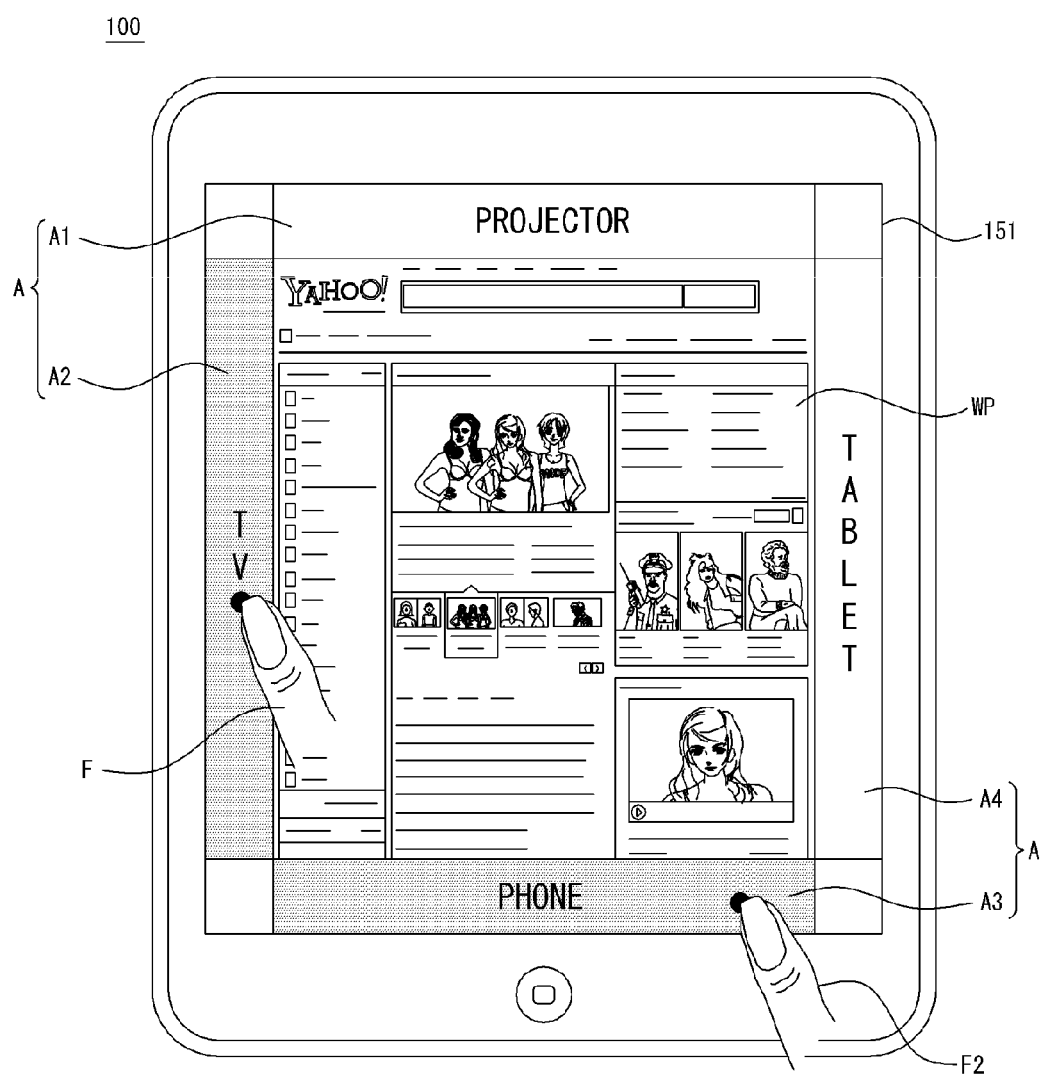

Referring to FIG. 20, the user may select the second information area A2 and the third information area A3 sequentially or simultaneously. The second information area A2 and the third information area A3 may respectively correspond to the TV and mobile terminal.

Figure 21:
Figure 21:
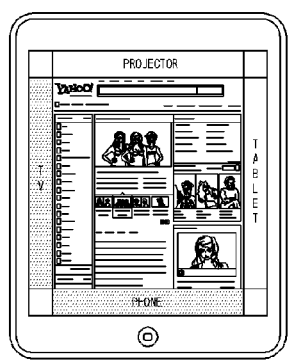
Figure 21:
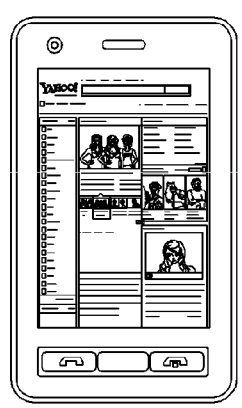

Referring to FIG. 21, when the TV and mobile terminal are selected by touching the second information area A2 and the third information area A3, as shown in FIG. 20, the controller 180 can transmit the contents to the TV (first electronic device 200a) and the mobile terminal (second electronic device 200b). Therefore, both the first and second electronic devices 200a and 200b can display the contents received from the mobile terminal 100 at the same time.

Figure 22:
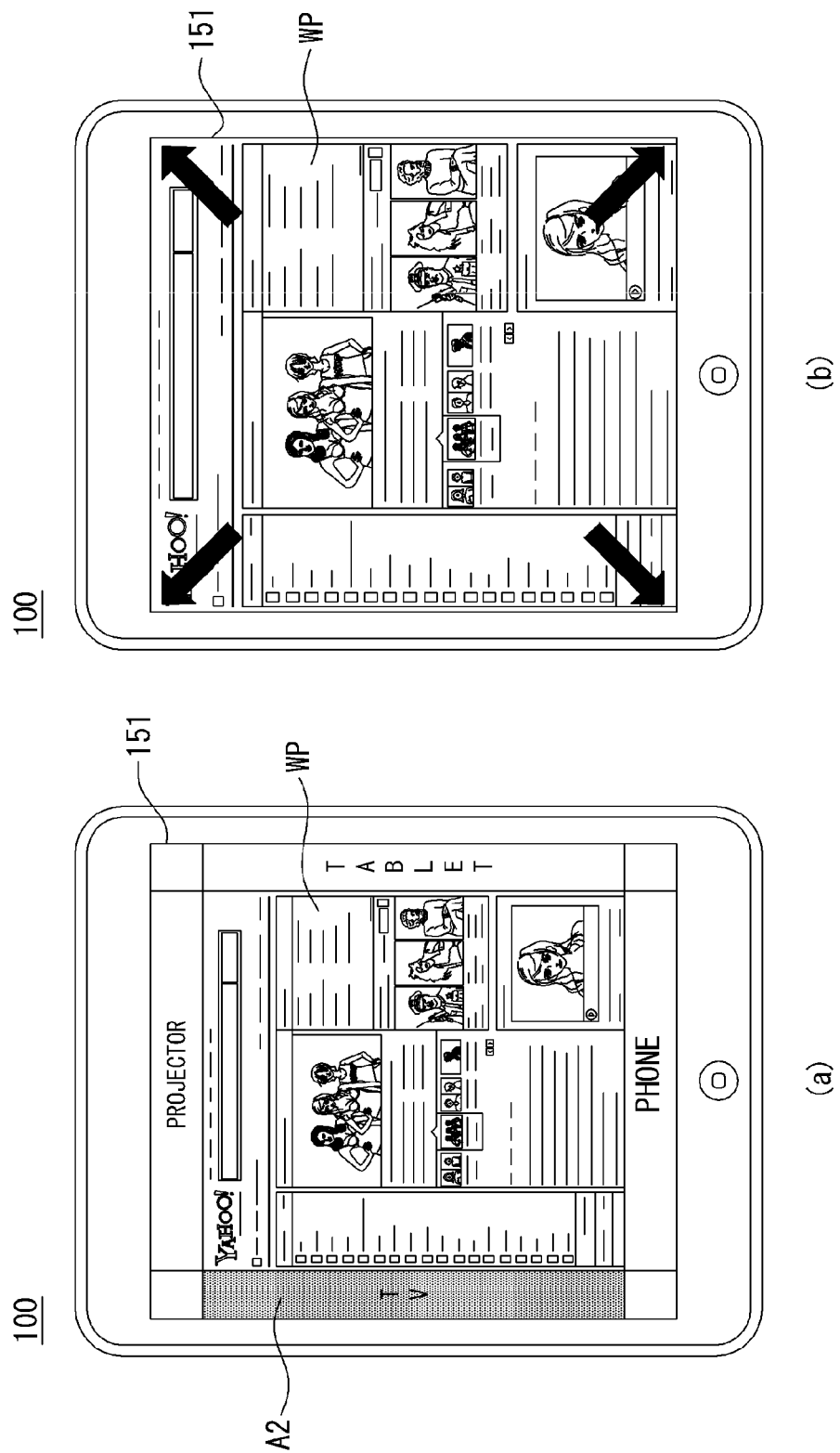
FIGS. 22 and 23 illustrate an operation performed by a mobile terminal after the contents transmitting operation—according to an embodiment of the present invention.
Figure 23:
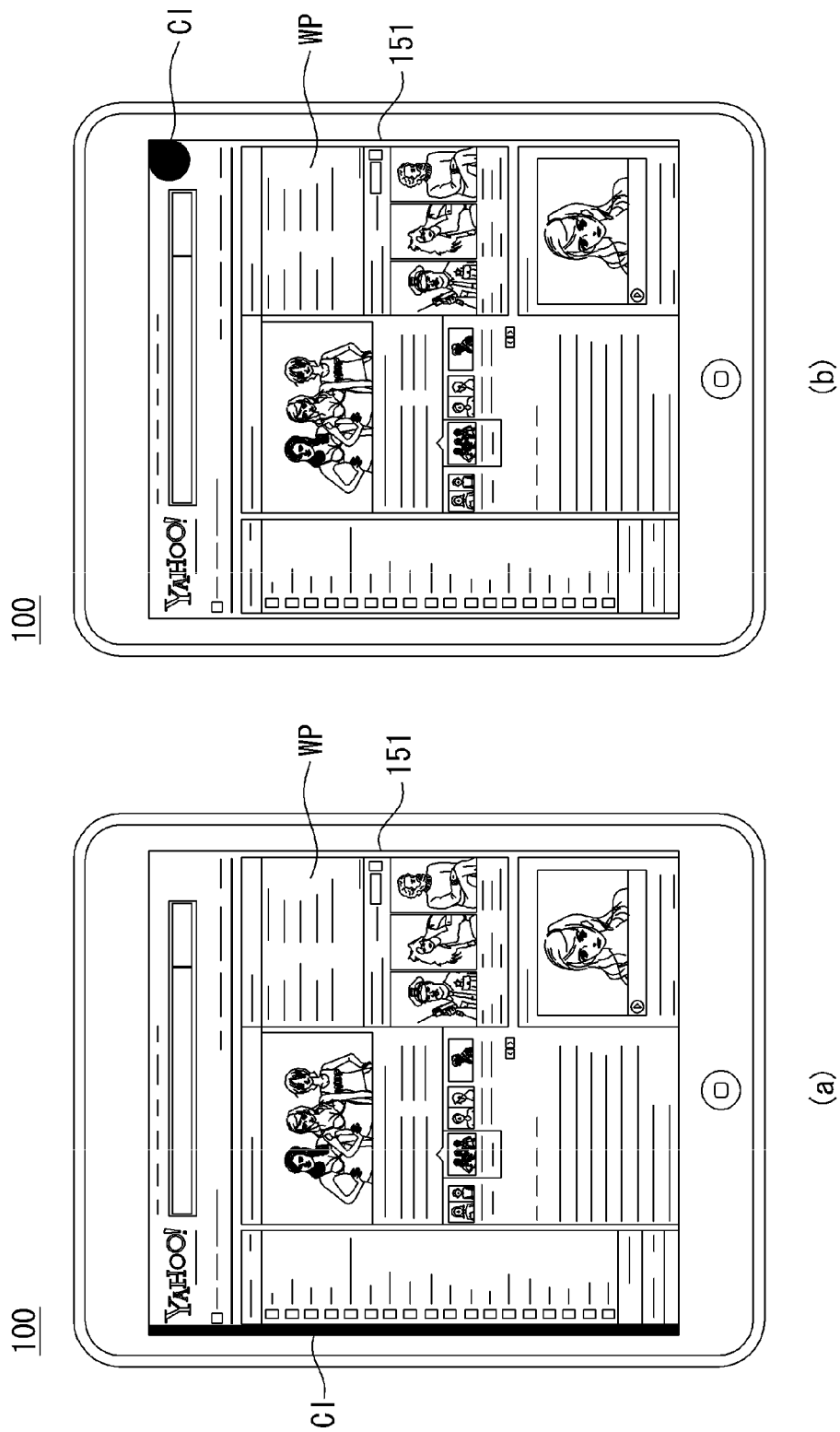

An operation that can be performed after the contents transmission operation of the mobile terminal 100 will be described referring to FIGS. 22 and 23. The mobile terminal 100 can perform various operations after the electronic device 200 to which the contents will be transmitted is selected.

Referring to FIG. 22(a), the controller 180 can maintain the reduced size of the web page WP even after the second information area A2 is selected. For example, the second information area A2 that has been selected, will be displayed differently or distinguishably compared to other information areas, and thus, the user can easily recognize that the specific electronic device 200, for example, TV, has been selected and the contents are being shared with the specific electronic device 200 and the mobile terminal 100.

Referring to FIG. 22(b), the controller 180 may restore the web page WP to the original display size. That is, the controller 180 can display the web page WP in the entire area of the display module 151.

Referring to FIG. 23(a), the controller 180 may display an indicator CI, which indicates that the mobile terminal 100 is transmitting the contents to the electronic device 200 or is sharing the contents with the electronic device 200, on one side of the web page WP. That is, a bar may be displayed on one side of the display module 151 in a distinguished color or shade. The indicator CI may not be displayed always and may be displayed only for a predetermined time when the user touches the web page WP.

Referring to FIG. 23(b), the controller 180 may display an indicator CI, which indicates that the mobile terminal 100 is transmitting the contents to the electronic device 200 or is sharing the contents with the electronic device 200, on a corner area of the web page WP. That is, the circular indicator CI can be displayed on the corner area of the display module 151 in a distinguishable color.

Figure 24:
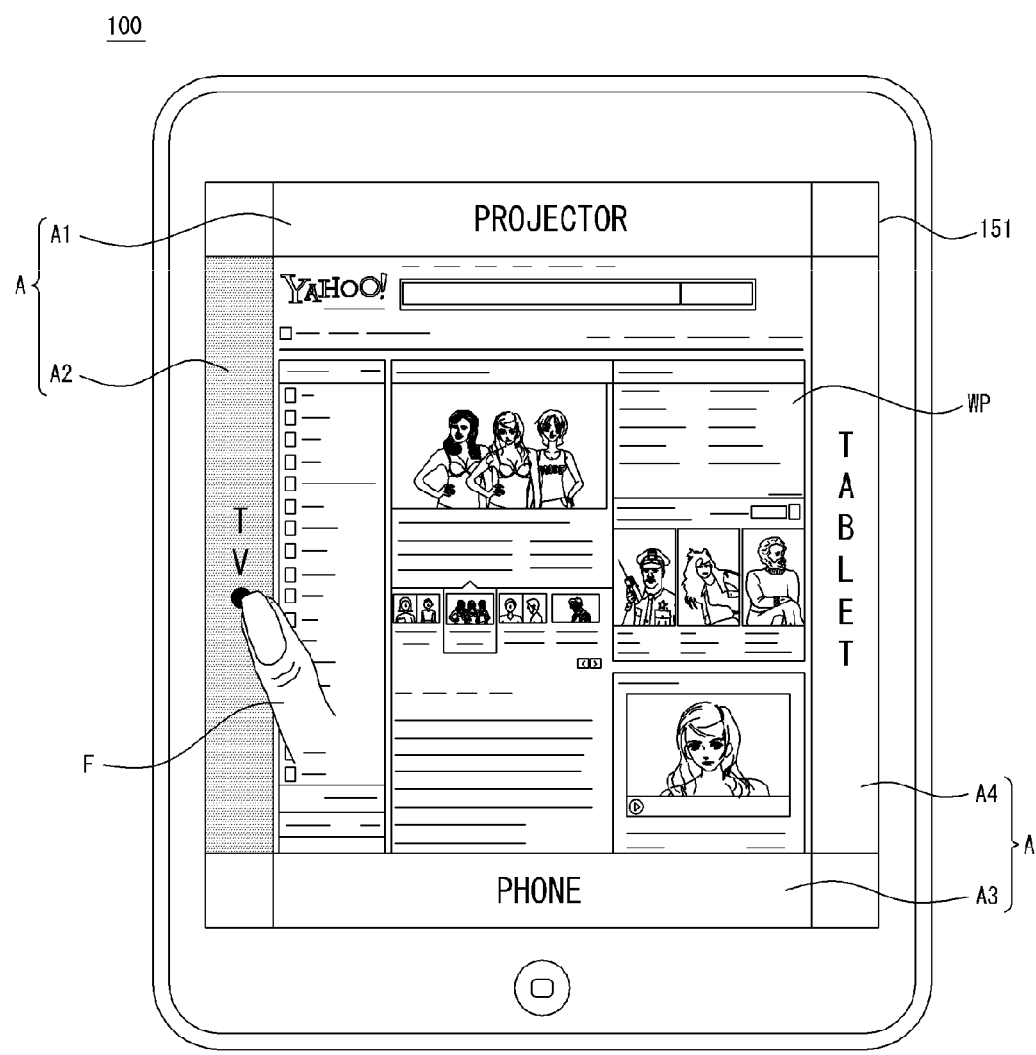
FIGS. 24 and 25 illustrate an operation performed by a mobile terminal according to an embodiment of the present invention to stop a contents transmission.
Figure 25:
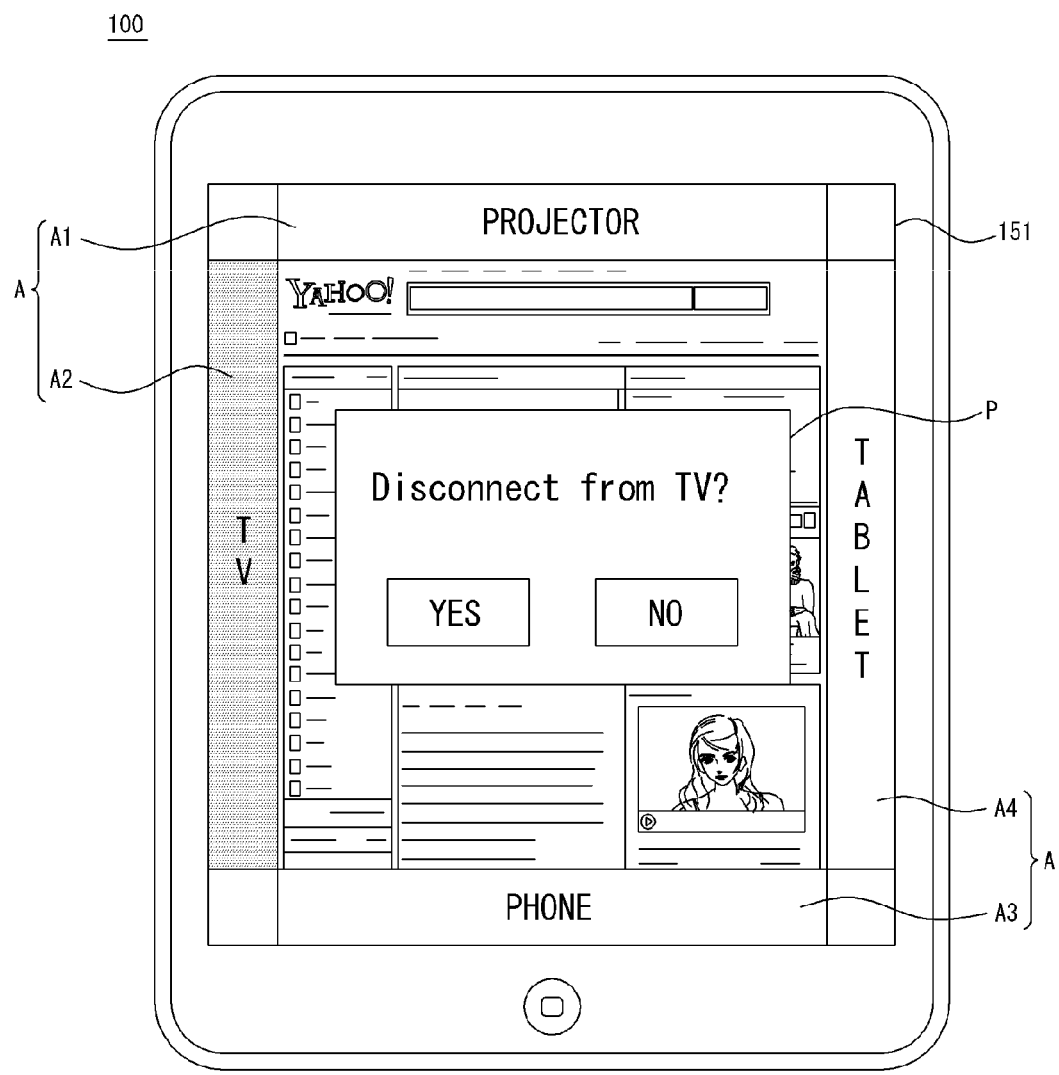

FIGS. 24 and 25 illustrate an operation of the mobile terminal 100 to stop contents transmission. The user can stop sharing the contents with other devices 200 by selecting the displayed information about the electronic devices 200 with which the contents are being shared.

Referring to FIG. 24, while the mobile terminal 100 is sharing the contents with the TV, the user may touch the second information A2 corresponding to the TV using a finger F. Referring to FIG. 25, the controller 180 may display a pop-up window P in response to the touch input shown in FIG. 24. The pop-up window P may ask the user to confirm whether to stop sharing the contents with the TV, and the user can select a desired function, "Yes" or "No." For example, when "Yes" is selected, the mobile terminal 100 stops transmitting the contents to the TV and the contents will not be shared with the TV.

FIG. 26 illustrates a selective contents transmission operation of the mobile terminal 100. Referring to FIG. 26, contents 1 may be a web page and contents 2 may be audio. The controller 180 may transmit contents only to electronic devices 200 suitable for the type of the contents.

For example, contents 1 may be a web page and can be transmitted to a TV, a tablet and a digital frame. In particular, it is noted that contents 1 or the web page is visually output, and can be transmitted only to electronic devices 200 having a display function. Contents 2 may be sound or audio that is audibly output, and can be transmitted to a TV, a tablet and a speaker. That is, contents 2 can be transmitted only to electronic devices 200 having an audio output function.

The controller 180, rather than transmitting the entire contents to a specific electronic device 200, may divide the contents into separate portions and transmit the divided portions to respective different electronic devices 200. For example, if the contents correspond to a moving picture, the controller may transmit the video portion of the moving picture to a TV and transmit the audio portion of the moving picture to a speaker.

The controller 180 can selectively display only information about electronic devices 200 that can output contents on the display module 151. For example, if the contents correspond to a web page lacking audio, no speaker is displayed on the display module 151 of the mobile terminal 100.

Figure 27:
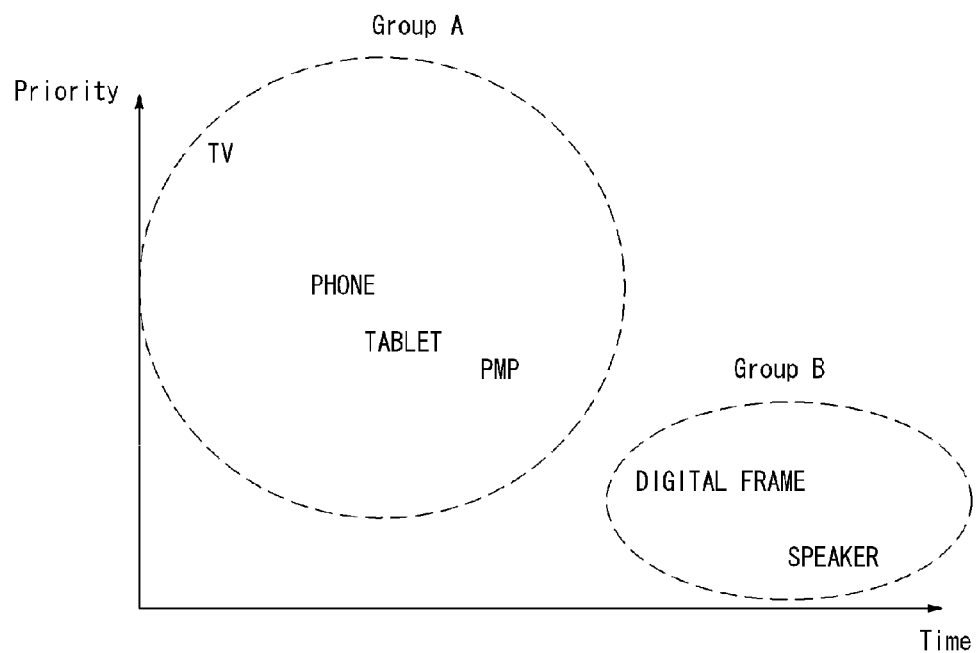
FIGS. 27 and 28 illustrate contents transmission priority of a mobile terminal according to an embodiment of the present invention.
Figures 28, 29:
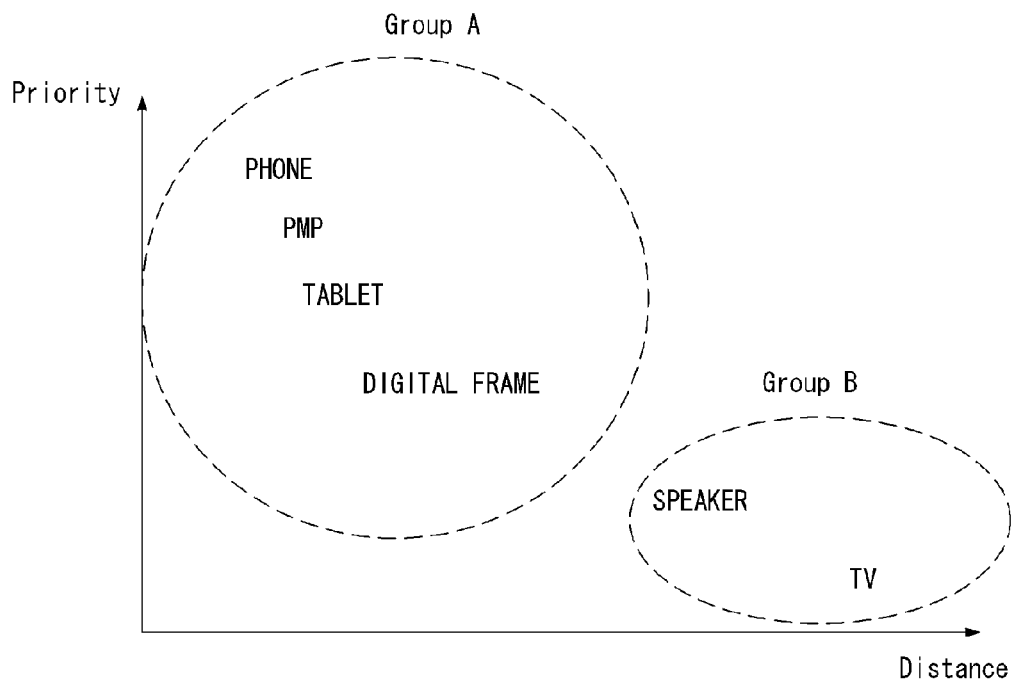
FIG. 29 illustrates a selective function execution operation of a mobile terminal based on types of electronic devices according to an embodiment of the present invention.

FIGS. 27 and 28 illustrate contents transmission priority of the mobile terminal 100. The electronic devices 200 displayed in the first and second areas A and B, as shown in FIG. 15, may be displayed according to their predetermined priority.

Referring to FIG. 27, the priority may be determined based on time when the electronic devices 200 were connected to the mobile terminal 100 or connection history. That is, a more recently connected electronic device 200 may have a higher priority than an electronic device 200 that was connected earlier. The controller 180 may classify the electronic devices 200 into group A and group B according to their priority, and display group A, which has a higher priority, in the first area A shown in FIG. 15 and display the group B, which has a lower priority, in the second area B shown in FIG. 15.

Referring to FIG. 28, alternative to the embodiment exemplified in FIG. 27, the priority may be determined based on distances between the mobile terminal 100 and the electronic devices 200. That is, an electronic device 200 that is located closer to the mobile terminal 100 may have a higher priority and an electronic device 200 that is located farther from the mobile terminal 100 may have a lower priority. The distance between the mobile terminal 100 and a specific electronic device 200 may be estimated based on the state of communication between the mobile terminal 100 and the specific electronic device 200. That is, a satisfactory communication state may indicate that the specific electronic device 200 is located relatively closer to the mobile terminal 100 and a poor communication state may indicate that the specific electronic device 200 is located farther from the mobile terminal 100. For example, in FIG. 28, the electronic devices 200 included in Group A are located closer to the mobile terminal 100, and thus, Group A has a higher priority than Group B which includes electronic devices 200 that are located farther from the mobile terminal 100.

FIG. 29 illustrates a selective function execution operation of the mobile terminal 100 based on types of electronic devices 200. Referring to FIG. 29, the controller 180 can selectively execute a specific function according to the capability of a selected electronic device 200. For example, the controller 180 executes a function of playing contents when a TV is selected since the TV does not have a storing function. Further, the controller 180 executes a function of playing and/or storing contents when a personal computer (PC) is selected since the PC has a playing function and a storing function. Furthermore, the controller 180 executes a function of storing and/or transmitting contents when a server is selected since the server has functions of storing and transmitting contents, but does not have a playing function.

FIGS. 30-35 illustrate an operation of the mobile terminal 100 to display information acquired from other electronic devices 200. The mobile terminal 100 can acquire contents information from the other electronic devices 200 and display the contents information on the display module 151.

Figure 30:
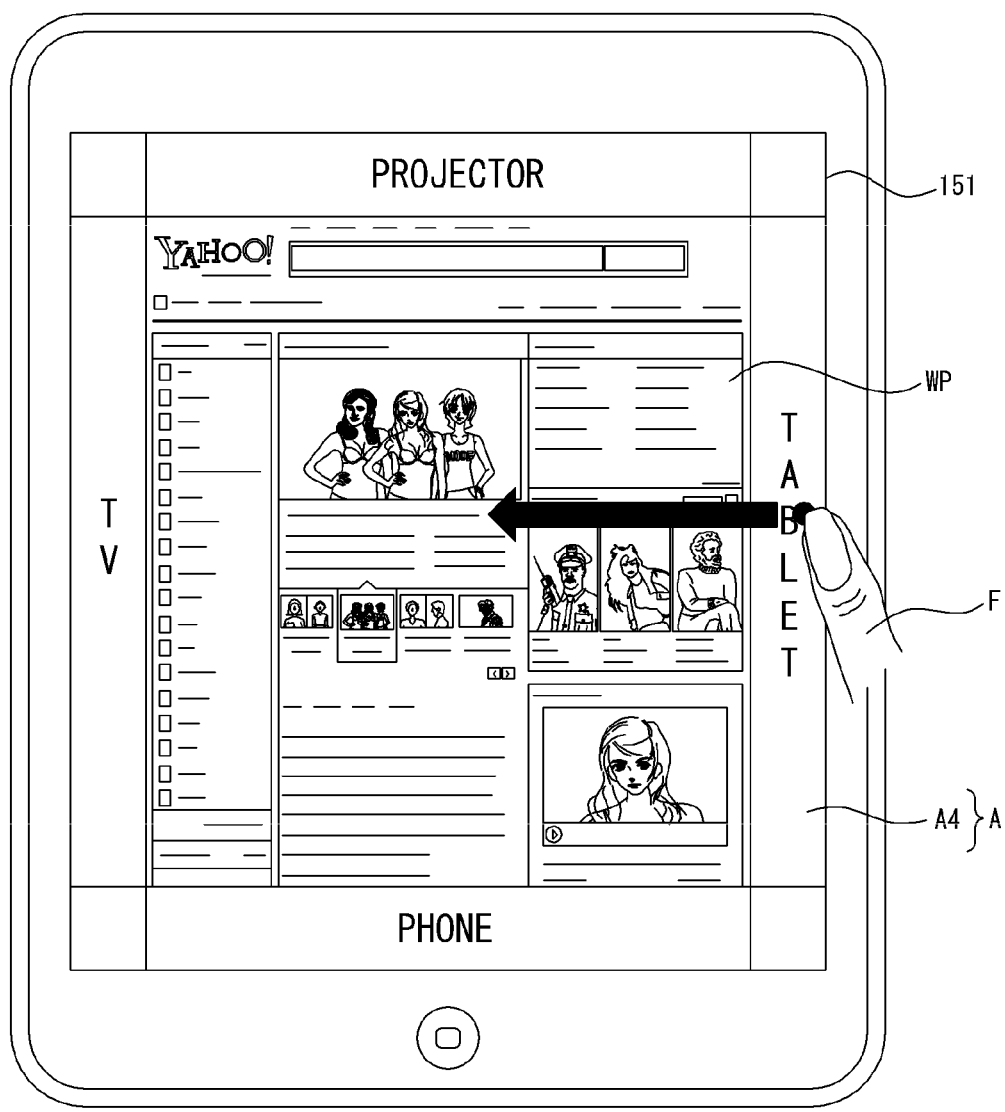
FIGS. 30-35 illustrate an operation performed by a mobile terminal according to an embodiment of the present invention to display information acquired from other electronic devices.
Figure 31:
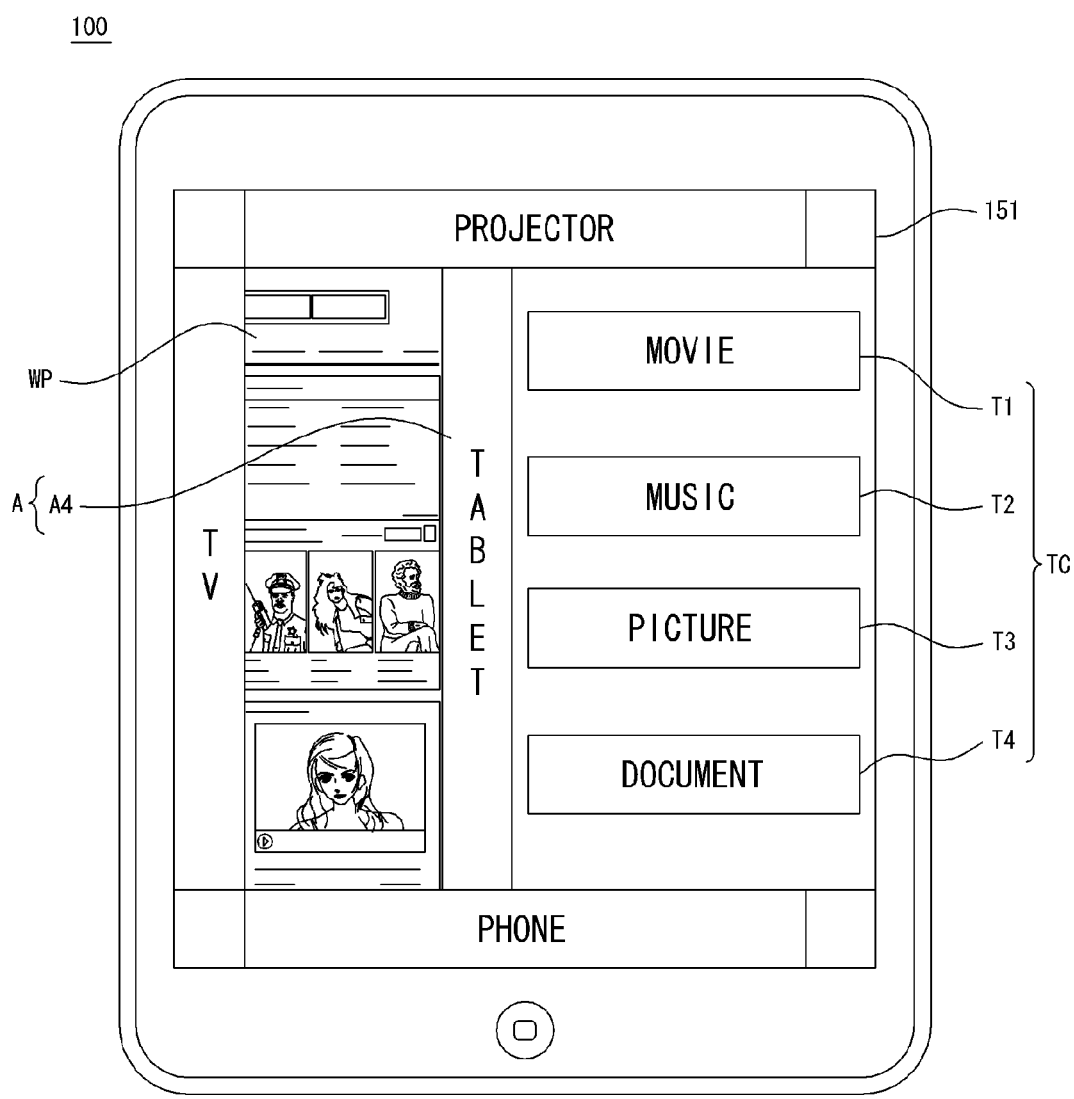

Referring to FIG. 30, the user may touch a fourth information area A4 on the display module 151 to select a specific electronic device 200, and then drag the selected specific electronic device 200 to a substantially central portion of the display module 151. For example, when a tablet is selected, as shown in FIG. 30, the controller 180 may display information about contents stored in the selected electronic device 200. For example, the controller 180 may display first, second, third and fourth contents information items T1, T2, T3 and T4 stored in the tablet, as shown in FIG. 31. When the user selects one of the displayed contents information items, the selected contents information may be received from the tablet and played at the mobile terminal 100.

Figure 32:
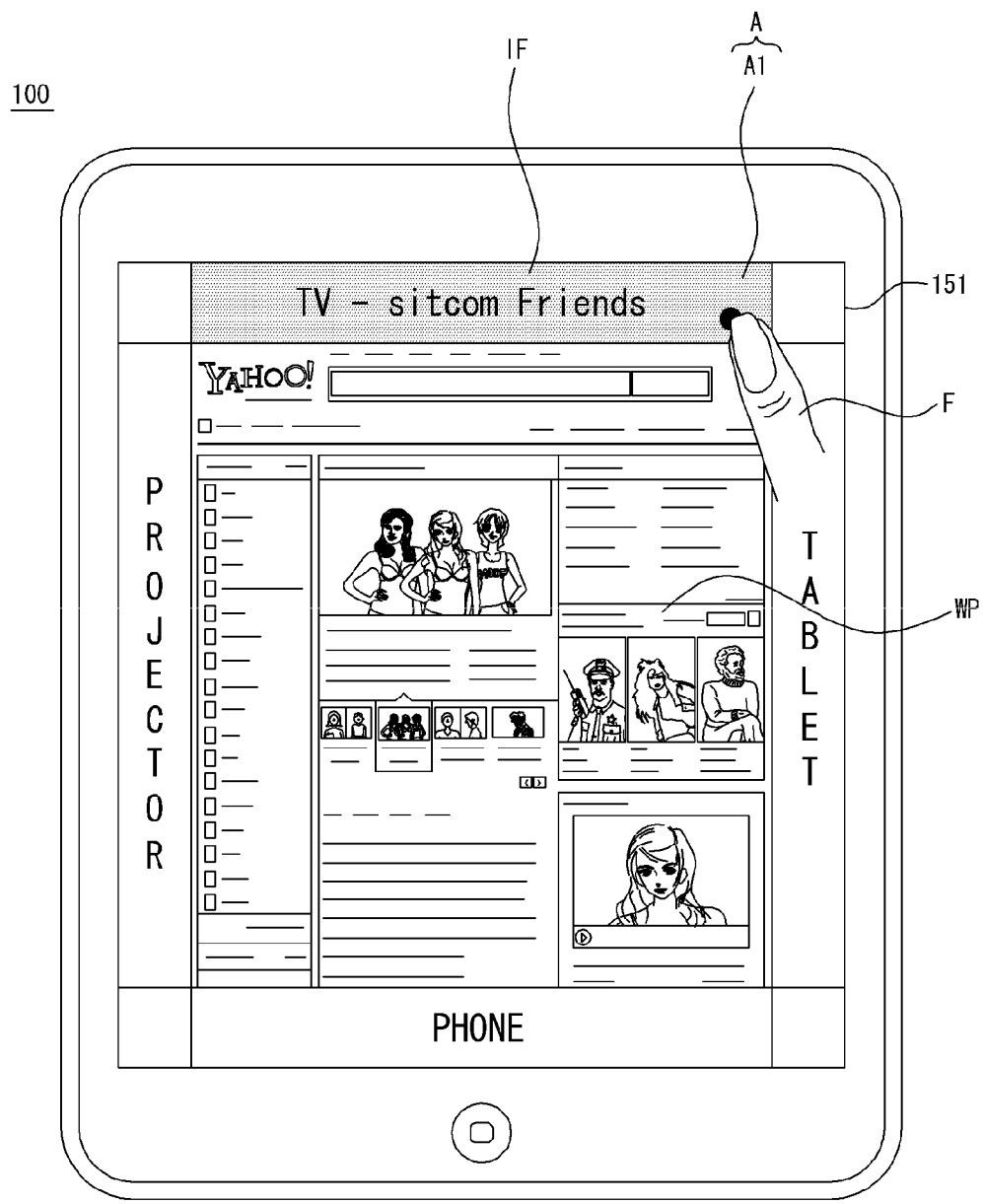
Figure 33:
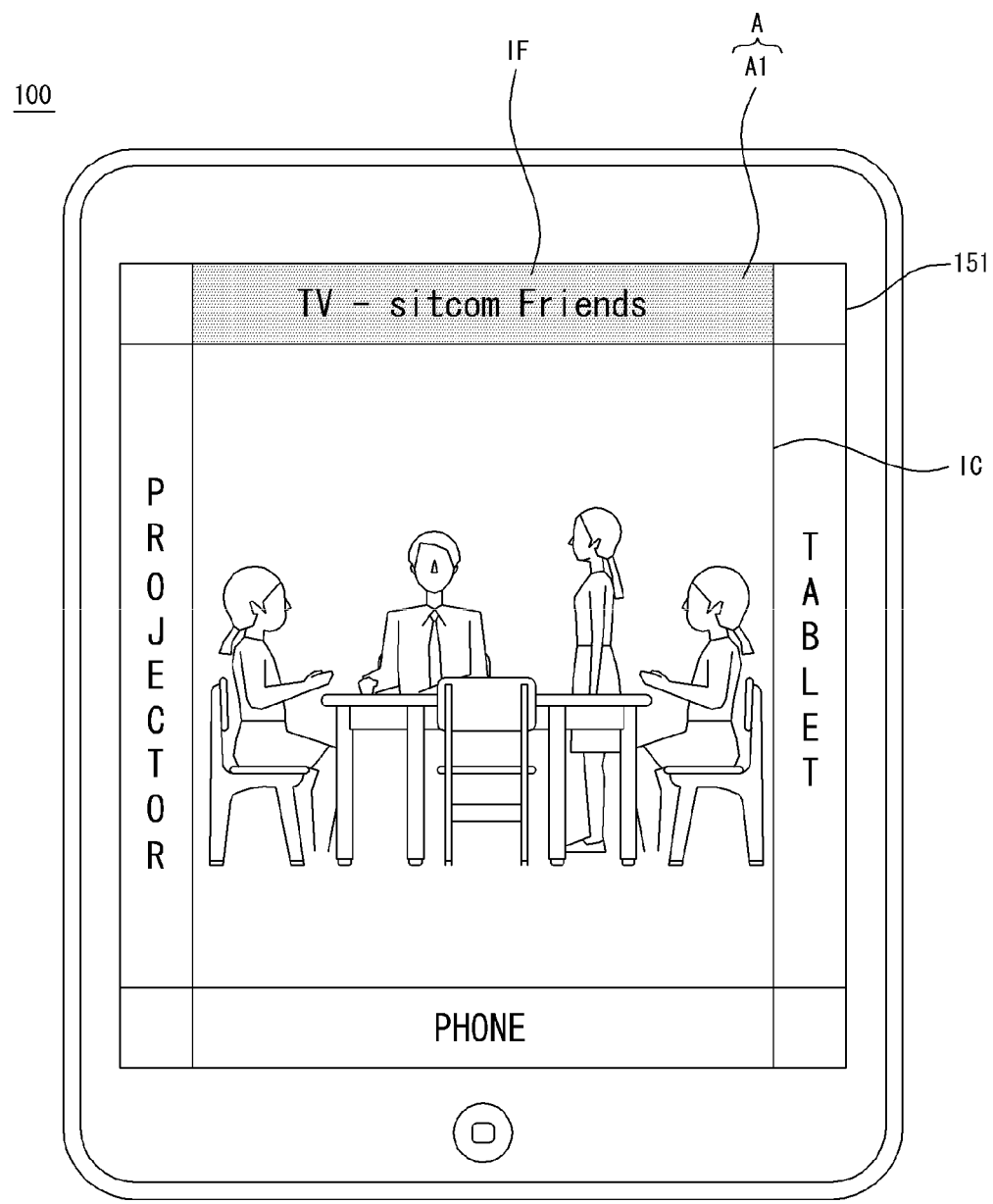

Referring to FIG. 32, the first area A on the display module 151 may display information about other electronic devices 200 and contents information available from the other devices 200. For example, the first information A1 indicates that the electronic device is TV and a broadcast program is being broadcast through the TV. Accordingly, the user of the mobile terminal 100 may select the first information A1 to receive the broadcast program from the TV, and the controller 180 may display the broadcast program on the display module 151 of the mobile terminal 100, as shown in FIG. 33.

Figure 34:
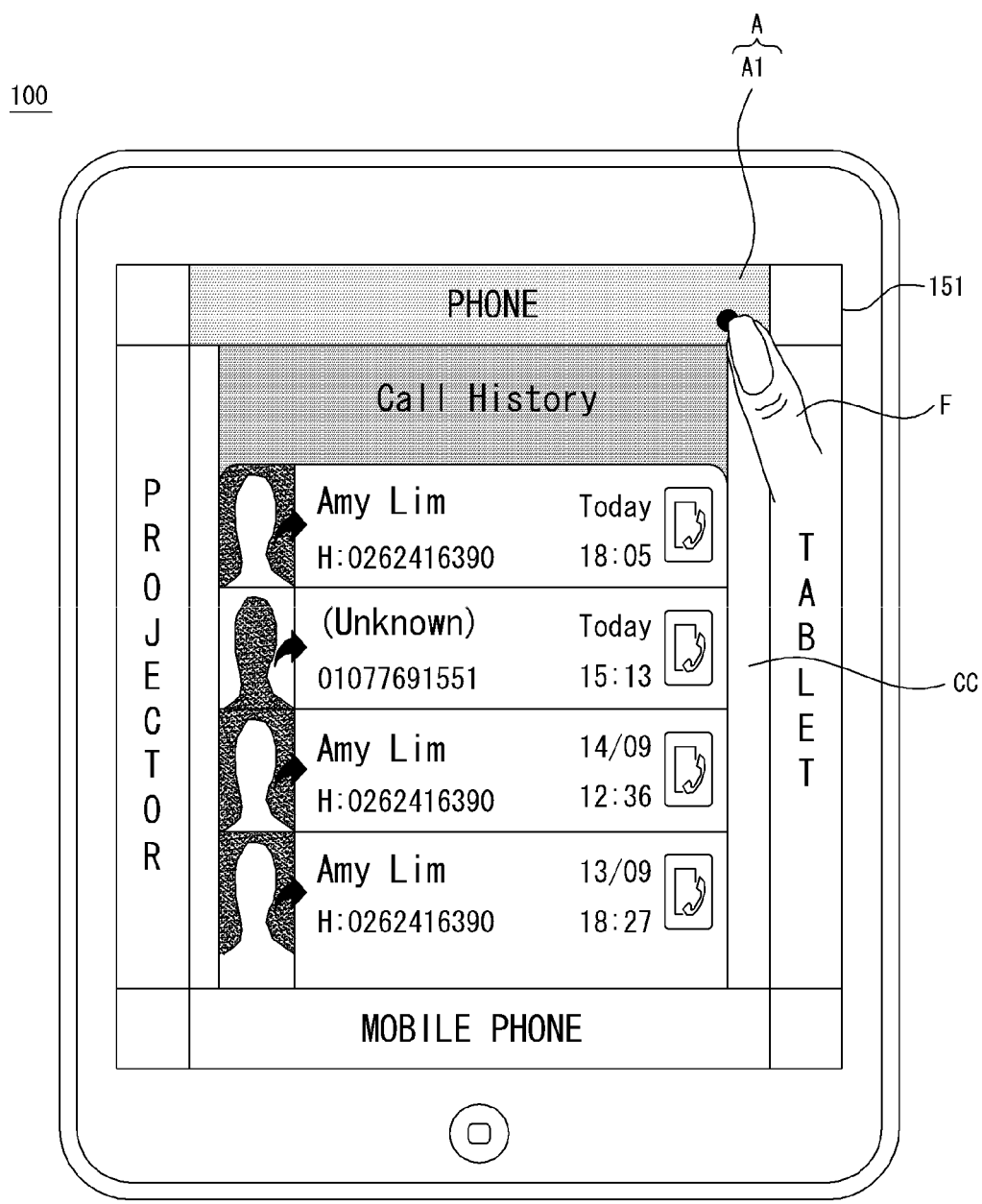

Referring to FIG. 34, the user may select the first information A1 corresponding to a phone. The controller 180 may display contents of the selected phone on the display module 151. For example, controller 180 may acquire and display a call history.

Figure 35:
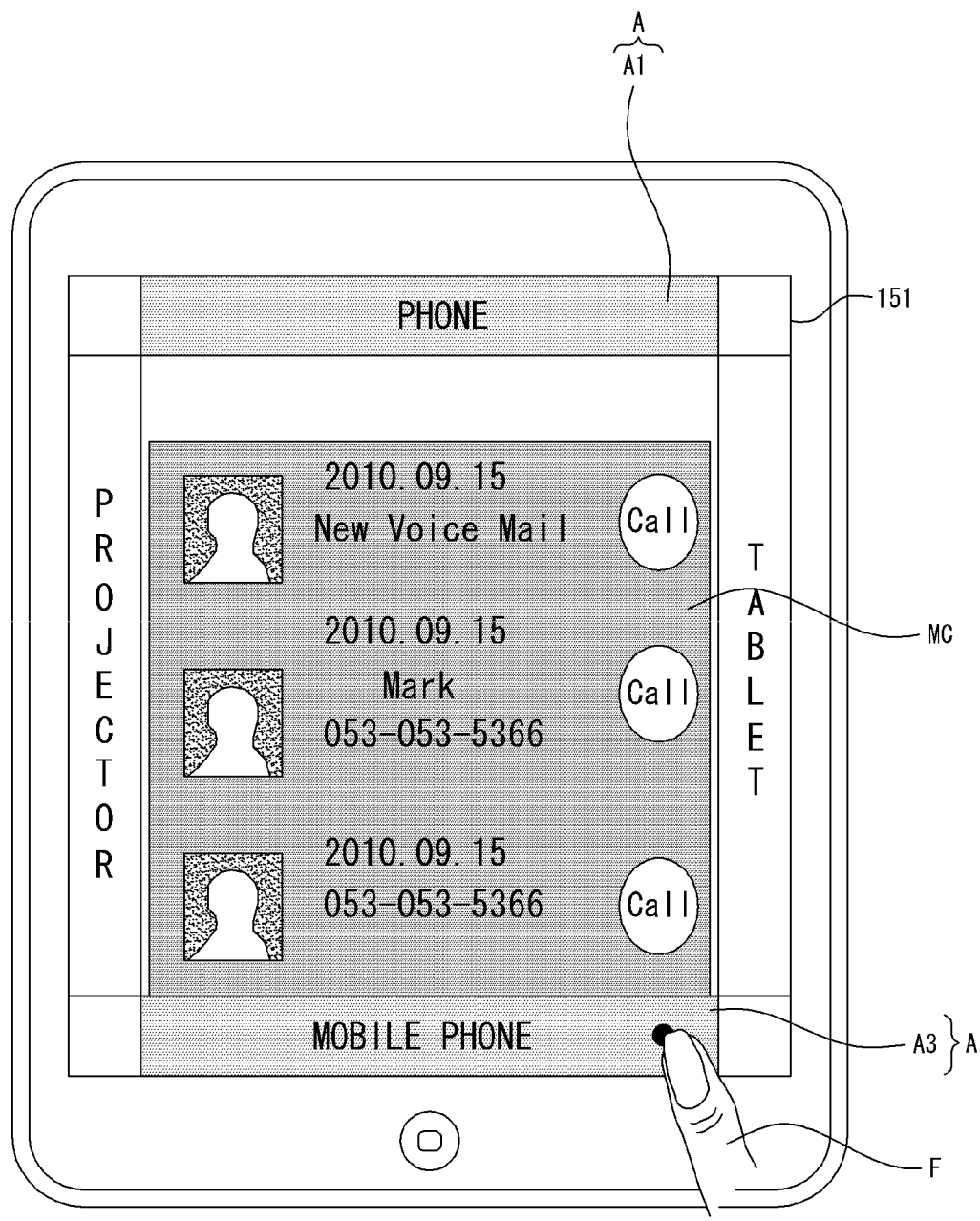

Referring to FIG. 35, the user may select the third information A3 corresponding to a mobile terminal. Then, the controller 180 may display information relating to the call history of the mobile terminal. That is, the controller 180 can acquire contents having the same attribute as that of the contents obtained from the currently selected electronic device 200 and display the acquired contents. For example, the controller 180 can display the call history of the mobile terminal on the display module 151.

Figure 36:
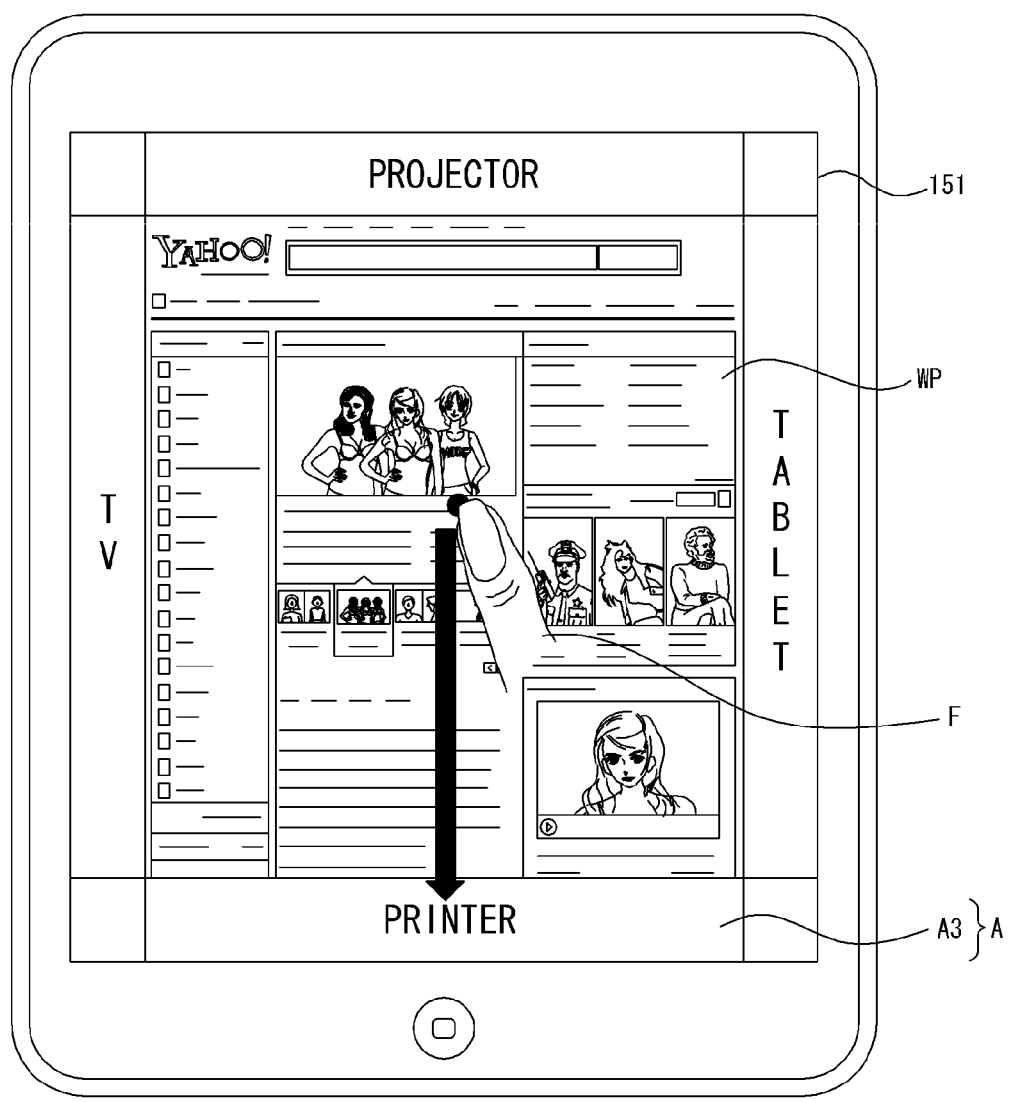
FIGS. 36 and 37 illustrate an operation performed by a mobile terminal according to an embodiment of the present invention to transmit information to another electronic device.
Figure 37:
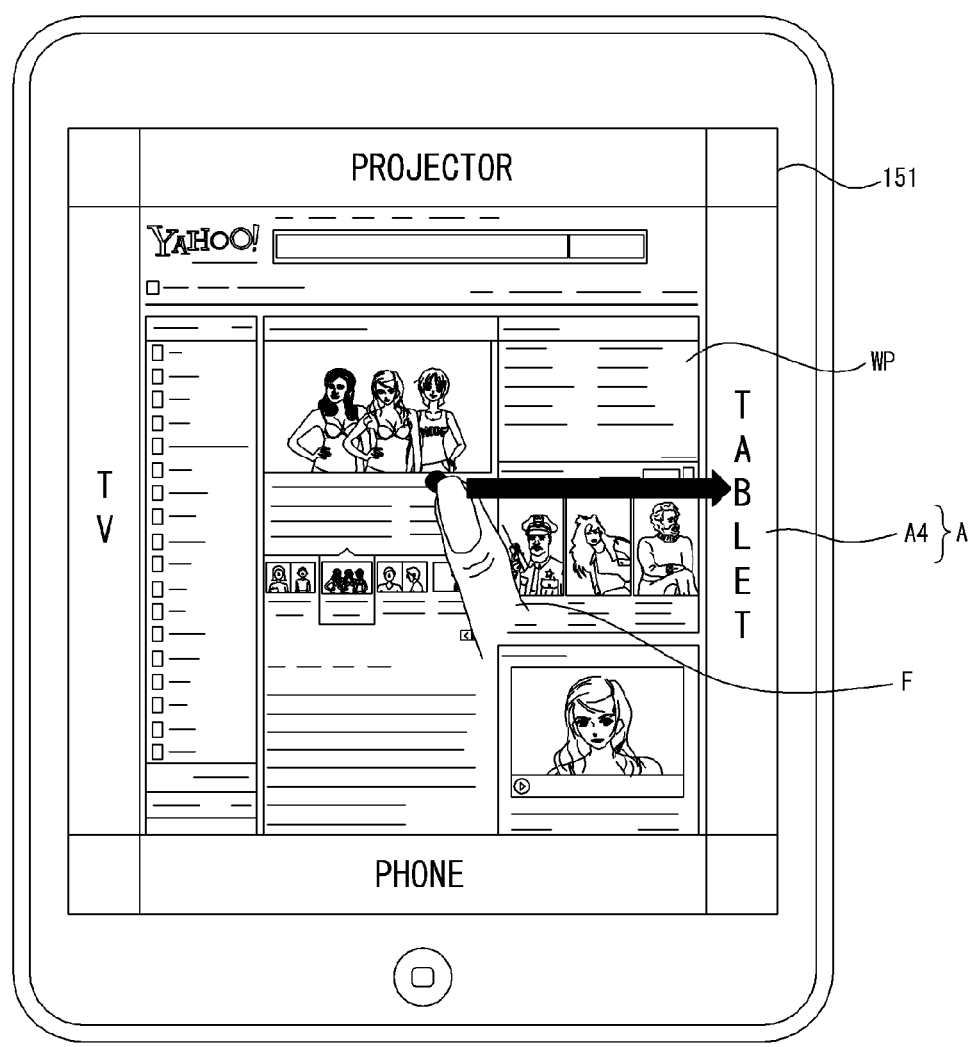

FIGS. 36 and 37 illustrate an operation of the mobile terminal 100 to transmit information to another electronic device 200. The controller 180 can transmit the contents displayed on the display module 151 to another electronic device 200.

Referring to FIG. 36, the user may touch a web page WP and drag it to third information A3 corresponding to a printer. Then, the controller 180 may transmit the web page WP to the printer to output or print the web page WP from the printer.

Referring to FIG. 37, the user may touch the web page WP and drag it to fourth information A4 corresponding to a tablet. Then, the controller 180 may transmit the web page WP to the tablet.

Figure 38:
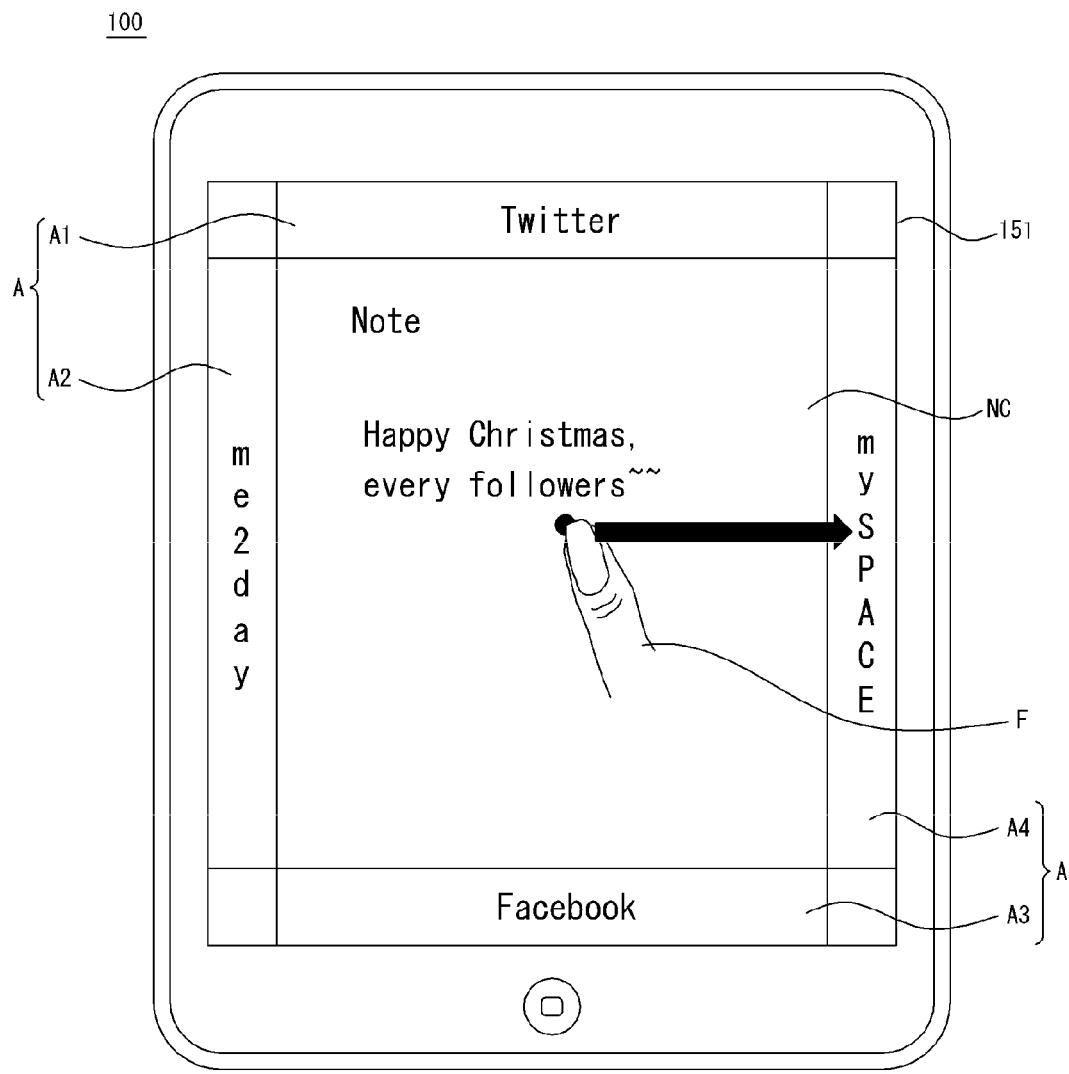
FIGS. 38 and 39 illustrate a menu displaying operation of a mobile terminal according to an embodiment of the present invention.
Figure 39:
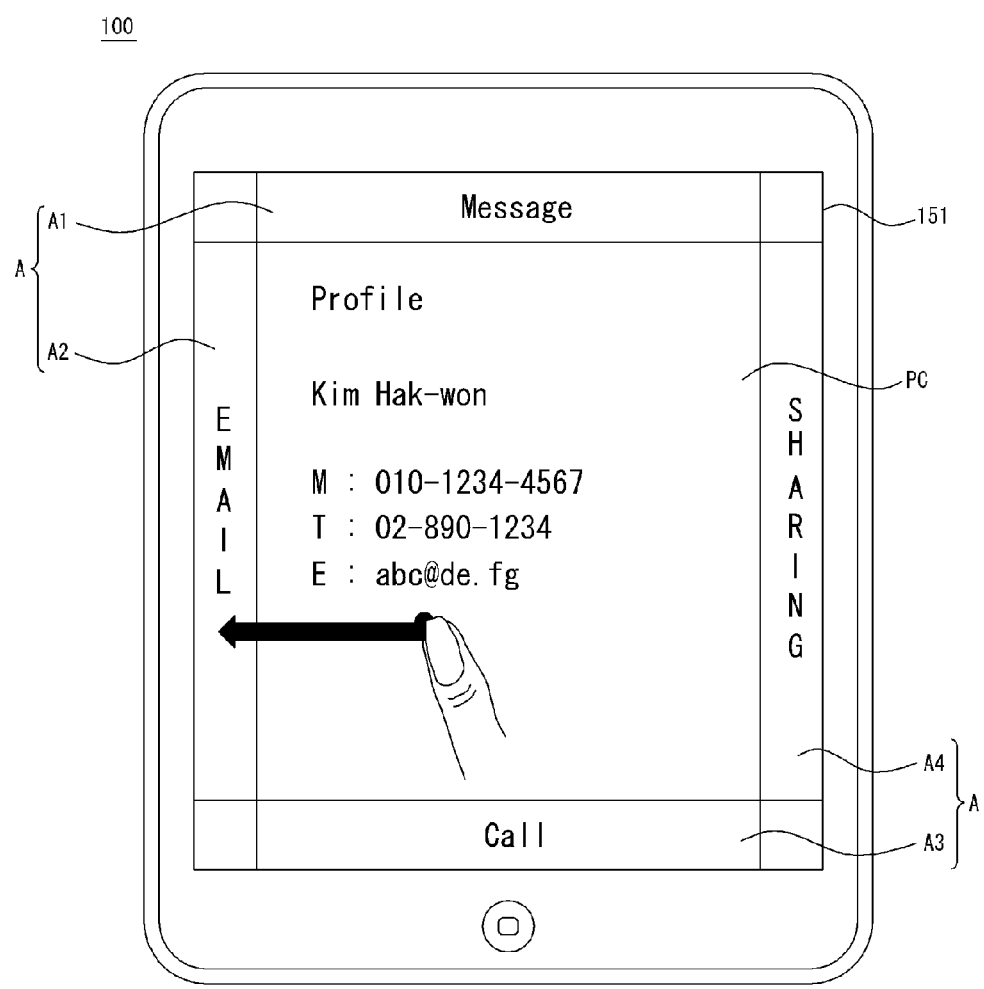

FIGS. 38 and 39 illustrate a menu displaying an operation of the mobile terminal 100. The controller 180 may display a menu relating to a function that is currently being executed on the display module 151.

Referring to FIG. 38, the user executes a note function NC to compose a note. When the user performs a multi-touch drag with his/her finger F after composing the note, a menu corresponding to note-related functions may be displayed in the first area A. For example, a menu for directly transmitting the note to a social network service (SNS) may be displayed.

Referring to FIG. 39, the display module 151 may display contact information PC. In this case, a contact information-related menu may be displayed in the first area A of the display module 151. For example, message transmission, email transmission, calling, and sharing menus may be displayed such that the contact information can be selected and applied to at least one of the displayed menu.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided to control a mobile terminal and the method includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the present invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a wireless communication unit configured to communicate with other devices;
a display comprising a touch screen, and configured to display content and to receive a touch input via the touch screen; and
a controller configured to control a size of a content display area in response to user input,
wherein:
content is displayed on a first area of the display in a first state, the first area including a second area and a third area, and the second area including a fourth area and a fifth area;
the first state is changed to a second state in which the content is displayed on the second area and information about at least one electronic device of a first group of one or more electronic devices is displayed on the third area when a first input for reducing the size of the content display area is received during the first state;

the content is displayed on the fourth area and information about at least one electronic device of a second group of one or more electronic devices is displayed on the fifth area while information about the at least one electronic device of the first group is still displayed on the third area when a second input for reducing the size of the content display area is received during the second state; and the at least one of the first group and the at least one of the second group are configured to communicate with the wireless communication unit, wherein the fifth area is positioned between the third area and the fourth area.

2. The mobile terminal of claim 1, wherein the first and second inputs each comprise a drag-and-touch input applied to the touch screen and the controller is further configured to reduce the size of the content display area in proportion to a dragged length of the drag-and-touch input.

3. The mobile terminal of claim 2, wherein the controller is further configured to set a size the second area displaying the content according to the reduced size of the content display area.

4. The mobile terminal of claim 1, wherein the first input comprises at least one drag-and-touch input applied to the touch screen and the controller is further configured to reduce the size of the content display area in proportion to a number of drag-and-touch inputs.

5. The mobile terminal of claim 4, wherein the at least one drag-and-touch input comprises a touch input received at two points on the touch screen and a dragging input comprising two pointers touching the two points and moving closer to each other while the two pointers maintain contact with the touch screen.

6. The mobile terminal of clam 1, wherein the third area is disposed around the second area, and the fifth area is disposed around the fourth area.

7. The mobile terminal of claim 1, wherein:
the touch screen is configured to receive a third input for selecting the information about at least one electronic device displayed on the third area or the fifth area; and
the controller is further configured to establish communication with the at least one electronic device corresponding to the selected information via the wireless communication unit to share the displayed content with the corresponding at least one electronic device.

8. The mobile terminal of claim 7, wherein the controller is further configured to control the display to display an indicator which indicates that the mobile terminal is transmitting the content to the corresponding at least one electronic device or is sharing the content with the corresponding at least one electronic device.

9. The mobile terminal of claim 1, wherein the controller is further configured to control the display to selectively display the information about each of the at least one of the first group or the second group of one or more electronic devices such that only electronic devices that are capable of outputting the content are displayed.

10. The mobile terminal of claim 1, wherein the controller is further configured to control the display to display the information about each of the at least one of the first group or the second group of one or more electronic devices based on a priority of each electronic device.

11. The mobile terminal of claim 10, wherein the controller is further configured to determine the priority of each corresponding electronic device based on at least:
a history of connection between the mobile terminal and the corresponding electronic device;

a distance between the mobile terminal and the corresponding electronic device; or
a status of communication between the mobile terminal and the corresponding electronic device.

12. The mobile terminal of claim 1, wherein:
the second area and the third area are not visually distinguishably segmented in the first state, and
the fourth area and the fifth area are not visually distinguishably segmented in the first state or the second state.

13. The mobile terminal of claim 1, wherein:
a size of the first area is equal to a sum of a size of the second area and a size of the third area, and
a size of the second area is equal to a sum of a size of the fourth area and a size of the fifth area.

14. A method of controlling a mobile terminal, the method comprising:
displaying content on a first area of a display of the mobile terminal in a first state, the first area including a second area and a third area, and the second area including a fourth area and a fifth area;
receiving a first input via an input unit of the mobile terminal during the first state for reducing a size of the content displayed on the first area;
displaying the content reduced in size in a second state and on the second area of the display in response to the first input; and
displaying information in the second state and on the third area about at least one electronic device of a first group of one or more electronic devices in response to the first input;
receiving a second input via the input unit during the second state for further reducing a size of the content displayed on the second area;
displaying the content further reduced in size in a third state and on the fourth area of the display in response to the second input; and
displaying information in the third state and on the fifth area about at least one electronic device of a second group of one or more electronic devices in response to the second input while information about the at least one electronic device of the first group is still displayed on the third area,
wherein the fifth area is positioned between the third area and the fourth area, and
wherein the at least one of the first group and the at least one of the second group are configured to communicate with the mobile terminal.

15. The method of claim 14, wherein:
the display and the input unit comprise a touch screen;
the first and second inputs each comprise at least one drag-and-touch input applied to the touch screen while displaying the content; and
the size of the displayed content is reduced in proportion to at least a drag length of the drag-and-touch input or a number of drag-and-touch inputs.

16. The method of claim 14, wherein the third area is disposed around the second area, and the fifth area is disposed around the fourth area.

17. The method of claim 14, further comprising:
receiving a third input for selecting the information about at least one electronic device displayed on the third area or the fifth area;
establishing connection with the at least one electronic device corresponding to the selected information in response to the third input; and sharing the displayed content with the corresponding at least one electronic device.

* * * * *